US012698295B2

(12) United States Patent
Yeo et al.

(10) Patent No.: US 12,698,295 B2
(45) **Date of Patent: *Aug. 4, 2026**

(54) METAL ORGANIC FRAMEWORKS

(71) Applicant: Royal Melbourne Institute of Technology, Melbourne (AU)

(72) Inventors: Leslie Yu Ming Yeo, Malvern East (AU); Amgad Rezk, Bayswater (AU); Heba Adel Aly Elsayed ElSayed Ahmed, Oak Park (AU); Yemima Charlotte Ehrnst, Melbourne (AU); Xinci Yang, Oakville (CA); Ninweh Jeorje, Kitchener (CA)

(73) Assignee: Royal Melbourne Institute of Technology, Melbourne (AU)

( * ) Notice: Subject to any disclaimer, the term of this patent is extended or adjusted under 35 U.S.C. 154(b) by 858 days.

This patent is subject to a terminal disclaimer.

(21) Appl. No.: 17/909,728

(22) PCT Filed: Mar. 5, 2021

(86) PCT No.: PCT/AU2021/050192
§ 371 (c)(1),
(2) Date: Sep. 6, 2022

(87) PCT Pub. No.: WO2021/174310
PCT Pub. Date: Sep. 10, 2021

(65) Prior Publication Data
US 2024/0209002 A1 Jun. 27, 2024

(30) Foreign Application Priority Data
Mar. 6, 2020 (AU) ................................ 2020900701

(51) Int. Cl.
*C07F 1/00* (2006.01)
*B01J 19/10* (2006.01)

(52) U.S. Cl.
CPC .............. *C07F 1/005* (2013.01); *B01J 19/10* (2013.01); *B01J 2219/00051* (2013.01); *B01J 2219/00932* (2013.01)

(58) Field of Classification Search
CPC ............ B01D 2253/204; B01J 31/1691; B01J 20/226; B01J 31/069; B01J 31/123; C07C 51/418; C07F 7/28; C07F 3/06; C07F 1/08
See application file for complete search history.

(56) References Cited

U.S. PATENT DOCUMENTS

| | | | |
|---|---|---|---|
| 7,942,568 B1 | 5/2011 | Branch et al. | |
| 10,265,647 B2 | 4/2019 | Friend et al. | |
| 2004/0066703 A1 | 4/2004 | Sparey-Taylor et al. | |
| 2011/0236269 A1 | 9/2011 | Inoue et al. | |
| 2022/0033425 A1* | 2/2022 | Ahmed .................. | B01J 20/226 |

FOREIGN PATENT DOCUMENTS

| | | | | |
|---|---|---|---|---|
| CN | 109433285 A | 3/2019 | | |
| WO | WO-2010075610 A1 | 7/2010 | | |
| WO | WO-2013082644 A1 | 6/2013 | | |
| WO | WO-2016179664 A1 * | 11/2016 | .......... | B06B 1/0644 |
| WO | WO-2020210868 A1 | 10/2020 | | |

OTHER PUBLICATIONS

H. Wei et al., 6 Journal of Materials Chemistry C, 12446-12467 (2018) (Year: 2018).*
M. de Jong et al., Scientific Data, 1-7 (2015) (Year: 2015).*
J. Tichy et al., Piezoelectric Materials, Chapter 7 in, Fundamentals of Piezoelectric Sensors, 119-185 (2010) (Year: 2010).*
Rezk et al., Nature Communications, 1-7 (2012) (Year: 2012).*
H. Ahmed et al., 5 Nanoscale Horizons, 1050-1057 (2020) (Year: 2020).*
A. Rezk et al., 28 Advanced Materials, 1970-1975 (2016) (Year: 2016).*
N. Stock, et al., Synthesis of metal-organic frameworks (MOFs): Routes to various MOF topologies, morphologies, and composites, 112 Chemical Reviews, 933-969 (2012) (Year: 2012).*
D. Fall et al., 273 Sensors and Actuators A, 303-310 (2018) (Year: 2018).*
R. Raghavan e al., 8 Microfluid Nanofluid, 73-84 (2010) (Year: 2010).*
C. Xu et al., 20 CrystEngComm, 7275-7280 (2018) (Year: 2018).*
H. Ahmed et al., Nature Communications, 1-9 (2019) (Year: 2019).*
M DeStefano et al., 29 Chemistry of Materials, 1357-1361 (2017) (Year: 2017).*
S. Liang et al., E97 Physical Review (2018) (Year: 2018).*
Ahmed et al. "A Novel Acoustomicrofluidic Nebulization Technique Yielding New Crystallization Morphologies," Adv. Mater. 2018, vol. 30, pp. 1602040, 1-7. See whole of the document but particularly the Abstract, p. 1 and Fig. 1.
Ahmed et al., "Acoustomicrofluidic assembly of oriented and simultaneously activated metal-organic frameworks," Nat Commun 2019, vol. 10 (Article No. 2282), pp. 1-9. See whole of the document but particularly the Abstract, pp. 1, 6-7 and Figs 1 and 3.
Ahmed et al "Ultrafast assembly of swordlike Cu3(1,3,5-benzenetricarboxylate)n metal-organic framework crystals with exposed active metal sites," Nanoscale Horizons, 2020, vol. 5, pp. 1050-1057. First published Apr. 14, 2020. See whole of the document but particularly the Abstract.
Banerjee et al., "High-throughput synthesis of zeolitic imidazolate frameworks and application to CO2 capture," Science, Feb. 15, 2008, vol. 319, Issue 5865, pp. 939-943.

(Continued)

*Primary Examiner* — Alexander R Pagano
(74) *Attorney, Agent, or Firm* — Bookoff McAndrews, PLLC

(57) ABSTRACT

A method of preparing a Metal Organic Framework (MOF), the method comprising (i) depositing a liquid comprising MOF precursors on a surface of a piezoelectric substrate, the MOF precursors comprising a metal ion and an organic ligand, and (ii) applying an electrical input to the piezoelectric substrate to induce propagation of acoustic waves across the piezoelectric substrate, which in turn causes the liquid to form an acoustowetting film on the piezoelectric substrate, within which the MOF precipitates.

20 Claims, 13 Drawing Sheets

(56) References Cited

OTHER PUBLICATIONS

Burrows et al., "Mixed-component metal-organic frameworks (MC-MOFs): Enhancing functionality through solid solution formation and surface modifications," CrystEngComm, 2011, vol. 13, pp. 3623-3642.

Paz et al., "Ligand design for functional metal-organic frameworks," Chemical Society Reviews, 2012, vol. 41, pp. 1088-1110.

Rezk et al., "HYbriD Resonant Acoustics (HYDRA), " Advanced Materials, vol. 28, Issue 10, pp. 1970-1975 (2016).

Xu, et al., "Surface acoustic wave (SAW)-induced synthesis of HKUST-1 with different morphologies and sizes". CrystEngComm 2018; 20(45): 7275-7280.

Stock N., et al., "Synthesis of metal-organic frameworks (MOFs): Routes to various MOF topologies, morphologies, and composites," 112 Chemical Reviews, 933-969 (2012).

* cited by examiner (a)

(b)

(c)

(d)

a.

a-plane view      c-plane view b.

● Cu ● O ◑ C ● H a.

b.

a.

b.

a.

b.

METAL ORGANIC FRAMEWORKS

CROSS-REFERENCE TO RELATED APPLICATIONS

This application is a U.S. national phase application of International Patent Application No. PCT/AU2021/050192, filed Mar. 5, 2021, which claims the benefit of and right of priority to Australian Patent Application No. 2020900701, filed Mar. 6, 2020, each of which is incorporated herein by reference in its entirety.

FIELD OF THE INVENTION

The invention relates in general to Metal Organic Frameworks (MOFs), and specifically to a method for preparing a MOF using a substrate onto which MOF precursors are deposited.

BACKGROUND OF THE INVENTION

Owing to their large surface area and high uptake capacity, metal-organic frameworks (MOFs) have attracted considerable attention as potential materials for catalysis, gas storage/separation, charge transport and storage, sensing, and drug delivery due to their remarkable surface area (in the order of $10^3$-$10^4$ m$^2$/g) and porosities (up to 90% of its free volume), and their highly customizable chemical structure.

MOFs have conventionally been synthesized through a variety of techniques, including hydrothermal, solvothermal, microwave, sonochemical and electrochemical synthesis. However, there are a number of drawbacks associated with these routes, including scale-up limitations and difficulties in translating this technology into industry.

In addition, for a number of applications the attractiveness of MOFs is strictly conditional on their availability as "activated" MOFs. In that regard, an "activated" MOF is one that is depleted from any guest molecules (e.g. synthesis solvent trapped within the pores) while maintaining structural integrity. Due to the significantly small size of MOF pores, MOF "activation" is challenging. Conventional activation strategies include post-synthesis heating and vacuum cycles, solvent-exchange, supercritical $CO_2$ (scCO$_2$) exchange, freeze-drying, and special chemical treatment. However, conventional activation procedures can be complex, energy intensive, and/or result in waste organic solvents that necessitate facilities for their treatment or disposal, particularly in large-scale manufacture.

Further, numerous attempts have been made to develop synthesis procedures that enable manipulation of the MOF surface chemistry. In that regard, achieving exposure of the embedded metal centres at the external surface of the MOF is particularly sought after as it allows effective binding of target molecules. Some methods have been developed to improve structural control during crystal growth, primarily through liquid phase epitaxy, which involves growing crystals through stepwise layer-by-layer deposition of the coordination polymers and metal complexes on self-assembled monolayers. Nevertheless, conventional strategies in that regard remain complex, often requiring strict control over the synthesis conditions to avoid blocking pore access, reduction in crystal quality, or even collapse of the entire crystal structure.

There remains an opportunity to therefore address or ameliorate one or more disadvantage or shortcoming associated with current MOF synthesis procedures.

SUMMARY OF THE INVENTION

The present invention provides a method of preparing a Metal Organic Framework (MOF), the method comprising: depositing a liquid comprising MOF precursors on a surface of a piezoelectric substrate, the MOF precursors comprising a metal ion and an organic ligand, and applying an electrical input to the piezoelectric substrate to induce propagation of acoustic waves across the piezoelectric substrate, which in turn causes the liquid to form an acoustowetting film on the piezoelectric substrate, within which the MOF precipitates.

By the proposed invention, acoustic waves propagating across a piezoelectric substrate interact with a liquid comprising MOF precursors deposited on the piezoelectric substrate such that the liquid forms an acoustowetting film on the surface of the piezoelectric substrate. In turn, the MOF precipitates within the film. In essence, the invention is based on the observation that MOFs can form under a distinct acoustic wave-driven flow phenomenon involving the formation and spreading of a thin acoustowetting film.

In addition to causing formation of the film, the acoustic waves can also cause nebulisation of the liquid from the film. Accordingly, the invention may also be said to provide a method of preparing a Metal Organic Framework (MOF), the method comprising: depositing a liquid comprising MOF precursors on a surface of a piezoelectric substrate, the MOF precursors comprising a metal ion and an organic ligand, and applying an electrical input to the piezoelectric substrate to induce propagation of acoustic waves across the piezoelectric substrate, which in turn causes the liquid to form an acoustowetting film on the piezoelectric substrate, within which the MOF precipitates and wherein the acoustic waves also cause nebulisation of the liquid.

In the method of the invention, the formation of the acoustowetting film has been observed to induce MOF precipitation. Without wanting to be limited by theory, it is postulated that precipitation of the MOF within the film may be caused by mechanisms that could include the mere formation of the film, possibly accompanied by evaporation and/or nebulisation effects deriving from the interaction of the film with the acoustic waves. In particular, it is believed the procedure of the invention allows exploitation of the combination of dimensional confinement afforded by the spreading hydrodynamics of the acoustowetting film and the capillary wave resonance imposed on its free surface by the acoustic vibration of the piezoelectric substrate. Surprisingly, MOFs of different morphology to that obtained through conventional means can precipitate within the film. Accordingly, under the conditions of the present invention, MOF precipitation can be advantageously fast (e.g. MOFs can precipitate within units of milliseconds), and different morphologies of the MOFs can be obtained. Accordingly, the method of the invention makes it straight forward to customise certain characteristics of the MOFs (e.g. dimension, morphology, etc.) by merely modulating the acoustic parameters.

In addition, fast evaporation dynamics associated with film nebulisation can offer a high degree of control over the kinetics of MOF formation, and consequently of the chemical structure of the formed MOF. For example, in some embodiments, by controlling the film spreading and its nebulisation, it is possible to intervene on the extent of MOF growth.

In some embodiments, the acoustic waves induced on the piezoelectric substrate comprise surface acoustic waves (SAWs), bulk acoustic waves, or hybrid surface-bulk acoustic waves. As an example of the latter, the acoustic waves may comprise a surface reflected bulk wave (SRBW).

Further, the method conditions can be modulated to afford MOFs substantially free of liquid. As such, the method of the invention enables the production of MOFs that, as synthesised, are "activated" MOFs. This is particularly advantageously in that the method of invention can provide MOFs that can be directly implemented into practical applications, given their surface area is readily available in the as-synthesised form. Accordingly, in some embodiments the acoustic waves leads to the activation of the MOF. Advantageously, MOFs that are activated in their as-synthesised form do not require post-synthesis activation procedures.

In the method of the invention, the acoustic waves are provided in a form such that the liquid forms an acoustowetting film on the piezoelectric substrate, within which film the MOF precipitates. By confining MOF formation within an acoustowetting film, it is possible to obtain MOFs having a large aspect ratio. This advantageously facilitates exposure of inherently hidden metal active sites of the MOF. As a result, the formed MOF can have more pronounced chemical reactivity, for example as a catalyst, relative to a corresponding MOF synthesised through conventional procedures. In that regard, MOFs produced by the procedure of the invention show a high degree of crystalline orientation, and the procedure itself affords remarkable control over the specific orientation of the crystals. This is particularly useful to expose specific crystal planes with favoured terminal groups and ultimately enhance selectivity of the MOFs towards desirable target species.

In addition, the procedure of the invention can also allow obtaining MOF structures with uncommon crystalline features relative to MOFs produced through conventional synthesis procedures.

In other aspects, there is also provided a metal-organic framework (MOF) prepared by the method of the invention.

While there is no particular limitation on the form of MOF that can be prepared by the method, the method is particularly suited for preparing MOFs in which the metal ion is one or more ion of a metal selected from Cu, Ni, Fe, Co, Zn, Mn, Ru, Mo, Cr, W, Rh, Zr, and Pd. In addition, the procedure is advantageously suited for the synthesis of MOFs based on organic ligands having at least two metal-coordinating groups, each selected from carboxylate groups, phosphylate groups, sulfonate groups, N-heterocyclic groups, and a combination thereof.

Giving the relative simplicity of the synthesis setup, the procedure of the invention can be particularly versatile for large-scale and continuous production of MOFs.

The invention also relates to method of collecting a MOF, the method comprising (i) preparing the MOF according to the method disclosed herein, wherein the acoustic waves also cause nebulisation of the liquid, which ejects the MOF from the piezoelectric substrate, and (ii) collecting the ejected MOF. The method is particularly useful, for example, for collecting the MOF in a storage container for subsequent use, or for the direct spray/print deposition of MOFs on a variety of surfaces.

Further aspects and/or embodiments of the invention are discussed in more detail below.

BRIEF DESCRIPTION OF THE DRAWINGS

Embodiments of the invention will be now described with reference to the following non-limiting drawings, in which.

DETAILED DESCRIPTION OF THE INVENTION

Figure 1:
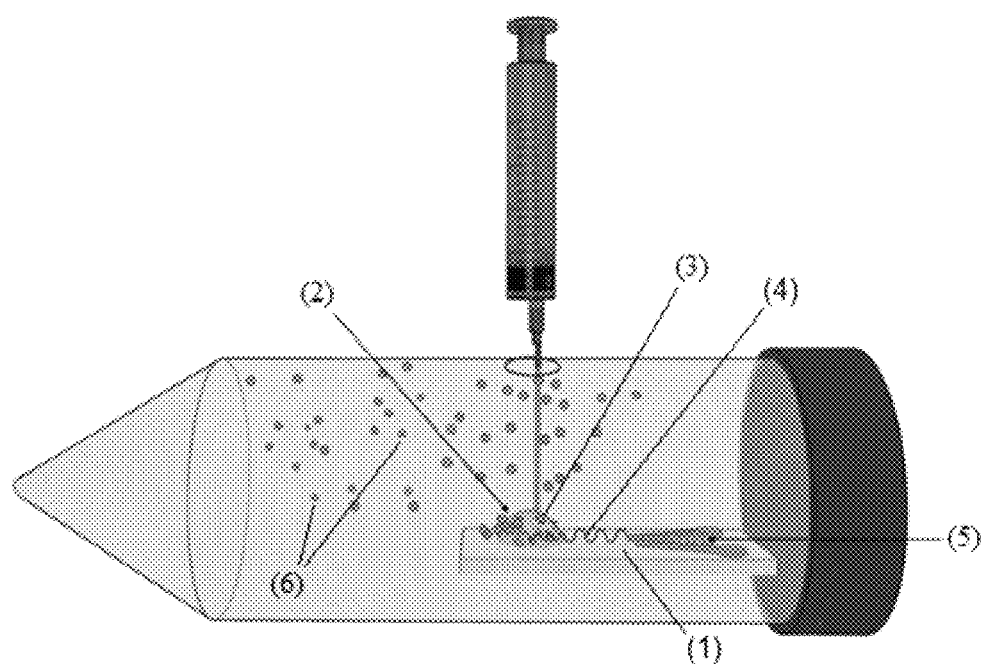
FIG. 1 shows a schematic of an acoustic nebulization platform on which MOF crystals are synthesized in accordance with an embodiment of the invention.

In the method of the invention, a liquid comprising MOF precursors is deposited on a surface of a piezoelectric substrate. By the substrate being "piezoelectric" is meant that the substrate is made of a material that can transduce electrical energy into mechanical energy, for example by vibrating in response to an applied electrical input.

The piezoelectric substrate for use in the invention may be made of any piezoelectric material that is capable of generating acoustic waves in response to an applied electrical input. By "acoustic wave" is meant herein a mechanical vibration front that propagates elastically from one point of a medium to other points of the medium without giving the medium as a whole any permanent displacement.

The piezoelectric material may include a metallic oxide or an insulating material. In that regard, the piezoelectric substrate may be made of a piezoelectric material that comprises, for example, lithium niobate ($LiNbO_3$), lithium tantalate ($LiTaO_3$), lithium tetraborate ($Li_2B_4O_7$), barium titanate ($BaTiO_3$), lead zirconate ($PbZrO_3$), lead titanate ($PbTiO_3$), lead zirconate titanate (PZT), zinc oxide (ZnO), gallium arsenide (GaAs), quartz, niobate, or a combination thereof. In some embodiments, the piezoelectric substrate is made of lithium tantalate ($LiTaO_3$) or lithium niobate ($LiNbO_3$). In some embodiments, the piezoelectric substrate is made of a single crystal piezoelectric material.

In the context of the invention, the acoustic waves generated by the application of the electrical input may be any kind of acoustic waves resulting in the liquid comprising MOF precursors forming an acoustowetting film of the kind described herein on the surface of the piezoelectric substrate. Examples of suitable acoustic waves in that regard include surface acoustic waves (SAWs), bulk acoustic waves, and hybrid surface-bulk acoustic waves (e.g., surface reflected bulk waves (SRBWs)).

In some embodiments, the acoustic waves comprise surface acoustic waves (SAWs). As used herein, the expression "surface acoustic wave" (or "SAW") refers to acoustic waves which vibrational energy is confined to the surface of the piezoelectric substrate (as opposed to propagating through the bulk of the piezoelectric substrate). Examples of SAWs suitable for the purpose of the invention include Rayleigh surface acoustic waves, shear horizontal SAWs ("SH-SAWs"), and surface transverse waves ("STWs"). In some embodiments, the acoustic irradiation is Rayleigh SAW.

In some embodiments, the acoustic waves comprise bulk acoustic waves (BAW). By the expression "bulk acoustic wave" (or "BAW") is meant herein acoustic waves which vibrational energy is concentrated within the bulk volume of the piezoelectric substrate, and propagate along the bulk volume of the piezoelectric substrate. For example, the BAW may be a Lamb wave. We note a distinction between these waves, which are 1 MHz and above (see below) and where cavitation is not present or not dominant, compared to the conventional bulk acoustic waves around 100 kHz and below 1 MHz that is typically used in probe sonicators for conventional MOF synthesis, wherein cavitation is present. More importantly, the sonicators that are used in conventional MOF synthesis have not been reported for the generation on thin acoustowetting films on a substrate, which is essential to the present invention.

It is appreciated that the acoustic waves, including SAW or BAW, may be further characterised as either travelling or standing acoustic waves. In one or more embodiments, the acoustic wave may include travelling SAW, travelling BAW, standing SAW waves, standing BAW waves and combinations thereof.

In some embodiments, the acoustic waves comprise hybrid acoustic waves. By the acoustic waves being "hybrid" is meant that the acoustic waves result from the combination of surface and bulk acoustic waves. For example, the hybrid acoustic wave may be a surface reflected bulk wave (or "SRBW").

Propagation of acoustic waves in the form of SRBW is particularly advantageous. When SRBWs form, the piezoelectric substrate is able to sustain larger increases in the input power relative to instances in which SRBWs do not form (as in the case of pure SAWs). Without wanting to be confined by theory, this is believed to derive from the acoustic energy (and its associated dissipation through the piezoelectric substrate) being no longer confined to the surface of the piezoelectric substrate (as in the case of SAW), but distributed through the entire substrate volume. As a result, formation of SRBWs can drive faster precipitation of MOFs.

In addition, propagation of acoustic waves in the form of SRBW can ensure that the liquid comprising MOF precursors nebulises at a significantly higher rate relative to nebulisation induced by other waveforms, such as SAW. In that regard, SRBW can enhance nebulisation rate by more than an order of magnitude compared to pure SAW, and 2 to 3 orders of magnitude compared to pure Lamb waves. Without wanting to be limited by theory, it is believed that higher nebulisation rates deriving from SRBW may derive from substantially higher vibrational velocities achieved through mutual reinforcement via multiple reflection and constructive recombination events.

The acoustic waves may have any frequency resulting in the liquid comprising MOF precursors forming an acoustowetting film on the surface of the piezoelectric substrate. For example, the acoustic waves may have a frequency between about 1 MHz to about 100 GHz. In some embodiments, the acoustic waves have a frequency between about 1 MHz and about 10 GHz, for example about 10 MHz. In some embodiments, the acoustic waves have a frequency within the high frequency (HF) RF band (i.e. 3-30 MHz). In some embodiments, the acoustic waves have a frequency within the very high frequency (VHF) band (i.e. 30-300 MHz). Typically, the acoustic wave frequency would be a resonant vibration frequency of the piezoelectric substrate.

The frequencies disclosed herein distinguish the acoustic waves generated in the piezoelectric substrate in accordance with the invention from acoustic waves obtained using conventional devices (e.g. sonicators). While cavitation is not present or not dominant in acoustic waves generated at 1 MHz and above, cavitation is present in conventional bulk acoustic waves generated at frequencies around 100 kHz and below 1 MHz. As such, conventional bulk acoustic waves are not used for the generation on thin acoustowetting films on a substrate.

The method of the invention requires the application of an electrical input to the piezoelectric substrate. In turn, the electrical input induces formation and propagation of acoustic waves across the piezoelectric substrate.

The electrical input may be any electrical input resulting in the formation and propagation across the piezoelectric substrate of an acoustic wave of the kind described herein. Typically, the electrical input is in the form of an alternating electrical voltage. For the purpose of the invention, said electric voltage may be any electric voltage that is conducive to formation of acoustic waves that induce formation of an acoustowetting film of the kind described herein on the piezoelectric substrate.

In some embodiments, the electrical input comprises an input voltage that is less than 100 Vrms, less than 75 Vrms, less than 50 Vrms, less than 40 Vrms, less than 30 Vrms, less than 20 Vrms, less than 10 Vrms, less than 9 Vrms, less than 7.5 Vrms, less than 4.5 Vrms, or less than 1.5 Vrms. In some embodiments, the input voltage is less than 40 Vrms, for example about 26 Vrms.

The electrical input may comprise an input voltage alternating at any frequency that would be conducive to the formation and propagation across the piezoelectric substrate of an acoustic wave of the kind described herein. In some embodiments, the electrical input comprises an input voltage alternating at a frequency of between about 1 MHz to about 1 GHz, between about 1 MHz to about 750 MHz, between about 1 MHz to about 500 MHz, between about 5 MHz to about 500 MHz, or between about 10 MHz to about 100 MHz.

In some embodiments, the electrical input is an alternating electrical voltage provided under continuous wave excitation or under pulsed modulation.

When under continuous wave excitation, the electrical input comprises an electrical voltage alternating according to frequencies described herein.

When under pulsed modulation, the alternating electrical voltage is modulated to have any pulse duration (or frequency) that is conducive to formation of acoustic waves of the kind described herein. Suitable pulse durations in that regard may be from 10 ns to 2 s. In some embodiments, the pulse duration is from 100 ns to 2 s, from 1000 ns to 2 s, from 10,000 ns to 2 s, from 0.1 ms to 1 s, from 0.1 ms to 750 ms, from 0.1 ms to 500 ms, from 0.1 ms to 250 ms, from 0.1 ms to 100 ms, from 0.1 ms to 50 ms, or from 0.1 ms to 10 ms. In some embodiments, the electrical input is a pulse-modulated electrical voltage with pulse duration of between 0.1 ms to 400 ms.

Figure 11:
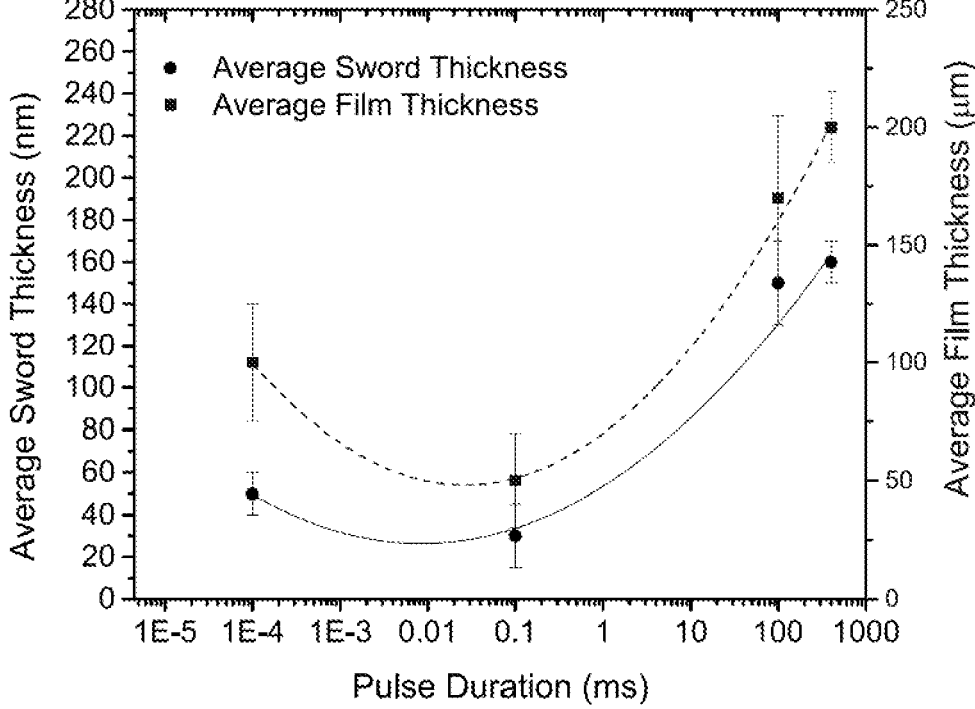
FIG. 11 shows a correlation between the average thicknesses of sword-like Cu-BTC MOF crystals (data circles) and the thickness of the acoustowetting liquid film (data squares) for different pulse durations (0.0001, 0.1, 100 and 400 ms) used during synthesis.
Figure 12:
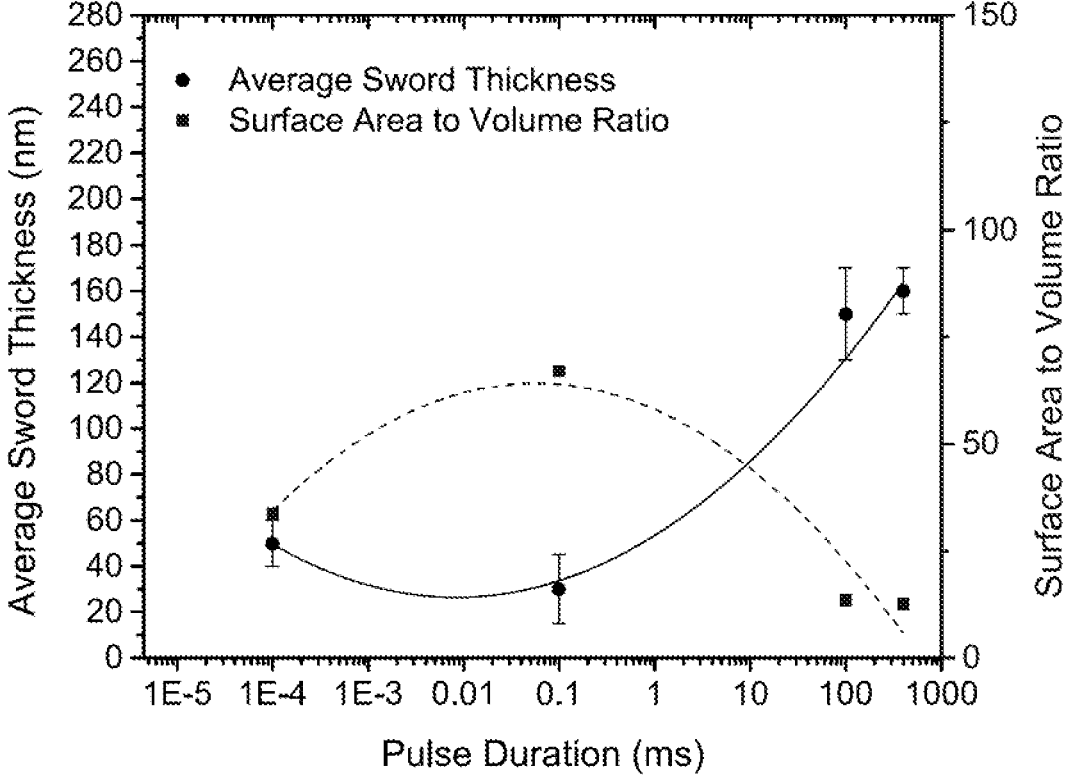
FIG. 12 shows the correlation between the average thicknesses of sword-like Cu-BTC MOF crystals (data circles) and the resultant surface area to volume ratio (data squares) of the crystals obtained using different pulse durations (0.0001, 0.1, 100 and 400 ms)

The adoption of a voltage input provided under pulse modulation advantageously affords significant control over the dimensions of the resulting MOF. In that regard, it was observed that MOF dimensions can be made to increase or decrease based on the pulse duration being either above or below an optimum value. Generally, it is observed that optimum pulse duration is associated with the case where the rate at which the liquid comprising MOF precursors is delivered to the piezoelectric substrate roughly matches the nebulisation rate. In those instances, the residence time of the acoustowetting film on the piezoelectric substrate is at its minimum. When the pulse duration is in a range providing for a residence below such minimum value, MOF of smaller dimensions are obtained as the pulse duration increases. With longer pulse durations above the minimum film residence time, the average thickness is however seen to increase. The ability to modulate MOF dimensions arbitrarily is particularly advantageous in that it allows promoting preferential growth of certain MOF crystal planes over others, thus making it possible to regulate the chemical reactivity of the resulting MOF. An example of the correlation between pulse duration, geometric characteristics of the acoustowetting film, and size of the resulting MOF crystals is shown in FIGS. 11 and 12.

The electrical input may be characterised by any electrical power that would be conducive to formation of acoustic waves of the kind described herein. Suitable values of electrical power fed into the piezoelectric substrate in that regard may be from 1 milliwatt to 10 watt. In some embodiments, the electrical input is provided at an electrical power between 1 milliwatt and 100 milliwatt, between 100 milliwatt and 1 watt, between 1 watt and 5 watt, or between 5 watt and 10 watt.

The electric input may be applied according to any means there would be known to the skilled person, provided the input results in formation of acoustic waves of the kind described herein.

For example, the electrical input may be applied to the piezoelectric substrate through electrodes in the form of interdigitated transducers (IDT) in electrical contact with the piezoelectric substrate. Accordingly, in some embodiments the piezoelectric substrate comprises at least one IDT.

The IDT may have any design that is conducive to the formation of acoustic waves of the kind described herein. As will be known to the skilled person, geometric features of the IDT would have to be determined in order to achieve the desired acoustic wave frequency for a given electrical input. In that regard, a skilled person will be readily capable to provide a suitable IDT design that would ensure formation of acoustic waves of the kind described herein.

Figure 2:
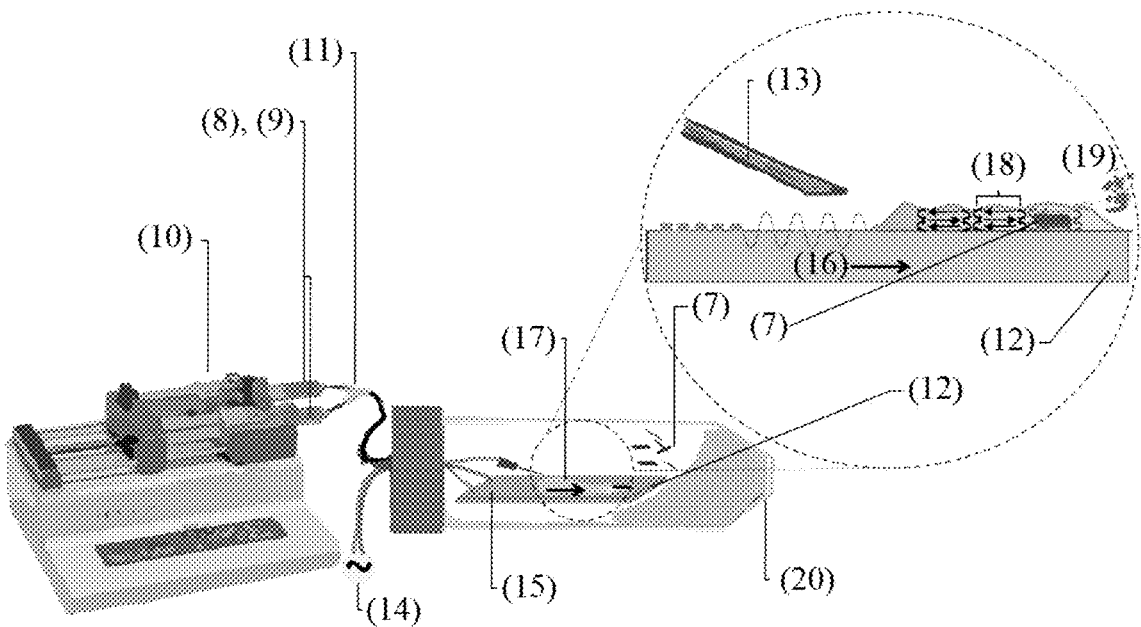
FIG. 2 shows a schematic illustration of the acoustic device for the synthesis of swordlike MOFs in accordance to an embodiment of the invention.

For example, the IDT may be configured as two interlocking comb-shaped electrodes. The stems of the comb-shaped electrodes may be parallel or at an angle relative to one another. For example, the stems of the comb-shaped electrodes may be converging at an angle. An example of such IDT configuration is shown in the schematic of FIG. 1. In accordance with other configurations, the stems of the comb-shaped IDT are parallel. An example of such IDT configuration is shown in the schematic of FIG. 2.

When in the form of two interlocking comb-shaped electrodes, the IDT may comprise any number of interleaved finger pairs that are conducive to form acoustic waves of the kind described herein. In some embodiments, the IDT comprises 5, 10, 20, 40, 60, 100, 200 or 300 interleaved finger pairs. The interleaved finger pairs may be characterised by a finger spacing from about 0.1 μm to about 900 μm, for example about 100 μm.

The IDT may be made of any electrically conductive material that would be suitable for the intended purpose. Examples of suitable materials in that regard include aluminium (Al), gold (Au), platinum (Pt), palladium (Pd), and an aluminium alloy. The latter may include Al as the main component and one or more of Ti, Si, Cr, W, Fe, Ni, Co, Pb, Nb, Ta, Zn, V, Au, Pt, and Pd.

In some embodiments, the piezoelectric substrate and the electrical input are selected such that application of the electrical input result in propagation of acoustic waves in the form of SRBWs.

Accordingly, in some embodiments, the piezoelectric substrate is a lithium niobate substrate and the electrical input is alternating electrical voltage provided under pulsed modulation at a frequency above 3 MHz. For instance, the electrical input may be alternating electrical voltage provided under pulsed modulation with pulse durations from 10 ns to 2 seconds. For example, the electrical input may be alternating electrical voltage provided under pulsed modulation with pulse durations between 0.001 milli-seconds (ms) and 1 second (s). In some embodiments, the electrical input is alternating electrical voltage provided under pulsed modulation with pulse durations between 0.1 ms and 1 s, or between 0.1 ms and 400 ms. A skilled person would be capable to readily identify suitable combinations of substrate material/design and electrical input conditions to generate acoustic waves of the kind described herein.

Suitable combinations in that regard also include substrate materials include: lithium niobate, lithium tantalate, lanthanum gallium silicate, ZnO, tellurium oxide, Quartz, polyvinylidene fluoride, bismuth, sodium bismuth titanate, gallium phosphate, ceramics and ceramic matrix composites.

In some embodiments, the piezoelectric substrate is a HYbriD Resonant Acoustics (HYDRA) device as described and operated in Amgad R. Rezk et al., "HYbriD Resonant Acoustics (HYDRA)", *Advanced Materials*, Volume 28, Issue 10, pp. 1970-1975 (2016), the content of which is incorporated herein in its entirety. Piezoelectric substrates suitable for use in the method of the invention also include substrates of the kind described in PCT/AU2016/050363 filed 13 May 2016 and published as WO/2016/179664 on 17 Nov. 2016, the content of which is incorporated herein in its entirety.

In the method of the invention, the acoustic waves propagating across the piezoelectric substrate interact with the liquid comprising MOF precursors such that the liquid forms an acoustowetting film on the piezoelectric substrate. Typically, the acoustowetting film moves across the surface of the piezoelectric substrate in a net unidirectional dynamic flow. That is, a given point of the film moves across the piezoelectric substrate along a linear direction such that, as a whole, the film moves substantially along that direction. This will be intended to include parallel flow, in which all points of the film move along parallel directions, and diverging flow, in which points of the film move along slightly diverging paths.

The dimension of the film can be influenced by the pulse duration of the electrical input. In that regard, it was observed that the pulse duration of the electrical input can have a strong influence on the intensity (i.e. amplitude) and resonant frequency (and hence the wavelength) of standing capillary waves imposed on the free surface of the film. Depending on the nature and characteristics of the acoustic wave, the acoustowetting film may therefore have an average thickness in the range of from about 0.1 μm to about 1 mm. In some embodiments, the acoustowetting film has an average thickness of from about 0.5 μm to about 1 mm, from about 1 μm to about 1 mm, from about 1 μm to about 100 μm, from about 10 μm to about 75 μm, from about 10 μm to about 50 μm, or from about 10 μm to about 25 μm.

In the method of the invention, the MOF precipitates within the acoustowetting film. Typically, MOF precipitation is observed upon formation of the acoustowetting film. Without wanting to be limited by theory, it is believed that formation of the film itself may be sufficient to provoke MOF formation due to local confinement of the MOF precursors, which locally oversaturate the film. Evaporation and/or nebulisation effects from the interaction between the film and the acoustic waves may also contribute to MOF formation. In particular, it is postulated that the hydrodynamics and capillary resonance associated with acoustically driven, dynamically spreading, and generally nebulising thin films leads to fast precipitation of MOFs due to oversaturation of the MOF precursors in the liquid. It is also believed that the height and the resonant capillary wavelength of the acoustowetting film (which can approximate the wavelength of the acoustic wave) imposes both vertical and lateral confinement of the liquid comprising MOF precursors within the film volume to set up compartmentalized 'cells' within which convective mixing of the precursors may occur in a manner akin, though considerably distinct in origin, to Rayleigh-Benard cells arising due to thermal convection. The MOF crystals that form under the precursor mixing within these cells are then restricted by the cells' dimensions. Control of the cells' dimensions is therefore believed to translate into control of the MOF dimensions.

For example, the method of the invention makes it possible to obtain MOFs having distinct sword-like crystal morphology, which are not observed in conventional solvothermal synthesis. This is due to formation of "cells" with large aspect ratio (both in terms of width and length, which are micron order, compared to their relatively thin nm-order thicknesses). In those instances, by further promoting nebulization of the film it is also possible to drive fast evaporation of the solvent. This additionally reinforces the resultant crystal geometry by further arresting crystal growth along the vertical (thickness) dimension. When liquid comprising MOF precursors is fed at a higher rate than the nebulisation rate, liquid build-up occurs since more liquid is supplied to the piezoelectric substrate than can be nebulized. This in turn is believed to reduce the intensity of the capillary wave resonance (at least its harmonic response associated with its given wavelength). Accordingly, through modulation of the electrical input and taking advantage of the rapid solvent evaporation associated with high nebulisation rates, the method of the invention can afford significant control over the thicknesses of these large aspect ratio (width and length with respect to the thickness) MOF crystals by arresting their vertical growth, which, in turn, allows exposure of the metal active sites at the crystal surface.

Typically, formation of the film is combined with nebulisation of the liquid comprising MOF precursors. By "nebulisation" of the liquid is meant that the liquid is converted into aerosol droplets (e.g. a mist or fine spray) that are expelled from the piezoelectric substrate. As it is commonly understood, acoustic energy associated with acoustic waves travelling across the piezoelectric substrate can leak into the liquid film causing destabilisation of the free surface of the liquid film. Beyond a critical input power, the liquid film breaks up to form aerosol droplets. In addition, fast evaporation dynamics associated with film nebulisation offers a high degree of control over the kinetics of MOF formation, and consequently of the chemical structure of the formed MOF. For example, by controlling the nebulisation rate it is possible to intervene on the extent of MOF growth.

Accordingly, in the method of the invention the acoustic waves may cause the liquid comprising MOF precursors to nebulise. Nebulisation may be induced at any nebulisation rate that is conducive to MOF precipitation. For example, the acoustic waves may cause the liquid comprising MOF precursors to nebulise at a nebulisation rate of at least 0.01 mL/min, at least 0.1 mL/min, at least 1 mL/min, at least 5 mL/min, at least 10 mL/min, or at least 20 mL/min. In some embodiments, the acoustic waves cause the liquid comprising MOF precursors to nebulise at a nebulisation rate of from about 0.01 mL/min to about 20 mL/min. Accordingly, in some embodiments the acoustic waves cause the liquid comprising MOF precursors to nebulise at a nebulisation rate of from about 0.01 mL/min to about 15 mL/min, from about 0.1 mL/min to about 10 mL/min, from about 0.5 mL/min to about 10 mL/min, from about 1 mL/min to about 10 mL/min, or from about 5 mL/min to about 10 mL/min.

Aerosol droplets (e.g. a mist or fine spray) that are expelled from the piezoelectric substrate may mechanically eject the MOF from the piezoelectric substrate itself. This advantageously allows to collect the ejected MOF for further use, or to deposit the ejected MOF on a target substrate for specific applications.

Accordingly, the invention also relates to a method of collecting a MOF, the method comprising (i) preparing the MOF according to the method disclosed herein, wherein the acoustic waves also cause nebulisation of the liquid, which ejects the MOF from the piezoelectric substrate, and (ii) collecting the ejected MOF.

In some embodiments, the ejected MOF is collected in or on a target substrate.

For example, the target substrate may be a container. In those instances, the ejected MOF may be collected in the container, where it can be kept for storage and later use. Collection of the MOF in a container may be achieved, for example, by having the piezoelectric device located within the container when the MOF is produced. As the MOF is ejected from the piezoelectric substrate during nebulisation, the MOF can physically accumulate within the container. An example of such arrangement can be seen in the schematic of FIG. 1.

In some embodiments, the target substrate is a surface. In those cases, the ejected MOF is collected on the surface. In those instances, the method is useful for the direct spray/print deposition of MOFs on a variety of surfaces of interest. Deposition of the MOF on the surface of interest may be achieved by any means known to the skilled person. For example, the ejected MOF may be collected/deposited directly on a target surface by having the surface positioned to interject the ejected MOF. In alternative configurations, the ejected MOF may be collected/deposited directly on a target surface by positioning the piezoelectric substrate relative to the target surface such that the ejected MOF accumulates on the surface.

In some embodiments, the target substrate has masked and un-masked surfaces and the ejected MOF is collected on an un-masked surface. For example, the masked surface may be masked by a stencil or a photoresist. As used herein, a "stencil" will be understood to be sheet of material (e.g. made of card, plastic, or metal) having a pattern of shapes cut out of it. Also, a skilled person would know of suitable photoresists, and how to mask selected portions of a surface using the photoresist, for example through photolithography. By masking a portion of the target surface, the method of the invention allows to provide MOF on selected portions of a target surface, for example to form patterned structures of MOF. For instance, the masked and un-masked target surface may have controlled and regular geometric characteristics.

The resulting patterned structures of MOF may be characterised by any spatial resolution afforded by the specific mask. By "spatial resolution" is meant herein the minimum distance between two separate patterned structures of MOF. For example, the patterned structure of MOF may be characterised by a spatial resolution of less than about 10 mm, less than about 1 mm, less than about 100 μm, less than about 10 μm, or less than about 1 μm. A skilled person would know how to mask the target surface to achieve a resolution within those ranges.

In some embodiments, the ejected MOF may be guided to deposit one-, two- or three-dimensional structures of MOF on the target surface. Guiding may be achieved, for example, by moving the piezoelectric substrate relative to the surface along pre-determined trajectories. This may allow, for example, the MOF to be built up to form multilayer three-dimensional MOF structures on the target surface through direct writing techniques akin to 3D printing. In addition, by guiding the ejected MOF it is also possible to ensure deposition of MOF structures onto the target surface having non-planar geometry (e.g. curved surfaces).

In essence, the proposed method and synthesis platform can provide a facile and versatile means for depositing, patterning, or printing a range of MOF types onto a variety of target surfaces.

The method of the invention may be performed at any temperature conducive to MOF precipitation in the acoustowetting film. In that regard, the MOF can advantageously form at a lower temperature relative to conventional MOF synthesis. For example, the method can result in MOF formation below 100° C. Accordingly, in some embodiments the MOF precipitates at a temperature below about 50° C., below about 40° C., below about 30° C., below about 25° C., or below about 20° C. In some embodiments, the method is performed at room temperature. As used herein, the expression "room temperature" will be understood as encompassing a range of temperatures between about 20° C. and 25° C., with an average of about 23° C.

In general, the process of the invention may be carried out at a pressure in the range from absolute pressure (0 to 100 bars), preferably in the range of 5 to 2 bar, more particularly at atmospheric pressure.

A schematic apparatus that can be used to perform the method of the invention is shown in FIG. 1. The schematic shows an acoustic platform (1) on which MOF crystals (2) can be synthesized in accordance with an embodiment of the invention. In a typical procedure, a given volume of a liquid comprising MOF precursors (3) is placed on a surface of the piezoelectric substrate (1), for example on its centre. Travelling SAWs (4) are generated on a piezoelectric substrate by applying an input voltage to IDTs (5) patterned on the piezoelectric substrate. Upon exposure of the droplet containing MOF precursors, the droplet forms an acoustowetting film and eventually breaks into smaller droplets (6), i.e. it nebulises. The droplets are ejected at high speeds leading to fast evaporation of the solvents and high local concentration of the precursors inside the liquid, leading to formation of MOF crystals (2) within milliseconds of exposure.

Another schematic apparatus that can be used to perform the method of the invention is shown in FIG. 2. The apparatus, for example, may be used for the synthesis of swordlike MOFs (7). The metal precursor and the organic ligand precursor are prepared and stored as separate solutions (8) and (9), which can be pumped by a dual syringe pump (10) into a Y-junction (11), where they are combined to form a liquid comprising MOF precursors. The liquid can then be provided on the surface of a piezoelectric substrate (12) by way of a syringe needle (13). An electrical input is then applied to the piezoelectric substrate through a radio frequency (RF) source (14), which is connected to IDTs (15) patterned on the piezoelectric substrate. Upon application of the electrical input, acoustic waves (16) form and travel along the piezoelectric substrate. The acoustic waves interact with the liquid comprising MOF precursors. As a result, an acoustowetting film (17) of thickness comparable to the capillary wavelength (18) forms and spreads along the surface of the piezoelectric substrate. MOF crystals (7) then form within the film (17), and are expelled from the piezoelectric substrate as the film nebulises (19) according to a mechanism of the kind postulated herein. As a result, MOF crystals (7) accumulate within the collection tube (20).

In particular, capillary resonance within the film induces vertical and lateral dimension confinement of the diffusion kinetics of the precursors inside the film, and thus of the crystals that are produced. The shape and dimensions of the forming crystals are believed to be imposed by the shape and dimensions of 'convective mixing cells' defined by the film thickness and its resonant capillary wavelength (which approximates that of the acoustic waves). Crystallization of the MOF can be accelerated by the fast evaporation rate arising from nebulisation of the film. The nebulization of the film further arrests the unidirectional growth of the MOF crystals along the vertical (thickness) direction of the film, thereby allowing production of MOFs with controlled morphology.

The method of the present invention advantageously allows one-step production of activated MOFs. Accordingly, in some embodiments the MOF is an activated MOF. By the MOF being "activated" is meant that the MOF is substantially devoid of compounds other than the structural compounds of the framework, yet, maintaining structural integrity. For example, an activated MOF is one that is substantially devoid of solvent. Typically, conventional solution-based synthesis of MOFs (for example solvo-thermal solution synthesis) provide MOF crystals which pores are filled with solvent. Conventionally, such residual solvent would have to be eliminated by post-synthesis extraction procedures which may include heating and vacuum cycles, solvent-exchange, supercritical $CO_2$ ($scCO_2$) exchange, freeze-drying, and special chemical treatments. Advantageously, when in activated form the MOF produced in accordance with embodiments of the invention can immediately be used in the intended application.

In addition, while the metal nodes of a MOF usually constitute the chemically and catalytically active sites that confer it with specific functionality for various applications, those nodes are usually embedded internally within the three-dimensional (3D) crystal structure of the MOF. Conventionally, it is therefore often necessary to incorporate pre- or post-synthesis steps to overcome the constraints associated with poor accessibility to those metal sites (particularly the diffusion transport limitation through the pore network) in order to enhance the MOFs' inherently low reactivity and to improve their performance in applications such as gas storage, energy conversion, molecular separation, and heterogeneous catalysis. For example, recent chemical modification strategies have proposed circumventing the innate burial of active sites either by constructing MOFs on conductive supports (e.g. nickel-iron meshes) to enhance its overall conductivity, or by combining the MOF with other materials (e.g. molybdenum disulphide) that possess active metallic edges. Such chemical modification protocols can however be complex and require significant care to prevent pore blockage, which in turn compromise the overall crystal quality or even collapse of the entire crystal structure itself. However, by enabling significant control over the growth of the MOF, the method of the invention is particularly advantageous to ensure production of MOFs having selectively exposed metal nodes.

Further, the proposed method is advantageously scalable. Scalability may be achieved, for example, by running any number of substrates in a parallel configuration. Accordingly, in some embodiments the method comprises depositing a liquid comprising MOF precursors on a surface of at least 2, 5, 25, 50, 100, or 1000 piezoelectric substrates. A skilled person would be capable of readily translating these embodiments into practice.

In addition, it may also be advantages to deposit the liquid comprising MOF precursors on a surface of a piezoelectric substrate in a continuous manner while the electrical input is being applied to the piezoelectric substrate. This would achieve continuous production of MOFs. Accordingly, in some embodiments the liquid comprising MOF precursors is continuously deposited on the surface of the piezoelectric substrate. In that regard, the liquid comprising MOF precursors may be deposited on the surface of the piezoelectric substrate according to any flow rate that is conducive to formation of the acoustowetting film and consequent precipitation of MOF. For example, the liquid comprising MOF precursors may be deposited on the surface of the piezoelectric substrate at a flow rate of at least about 0.01 ml/min, 0.1 ml/min, at least about 1 ml/min, at least about 10 ml/min, or at least about 20 ml/min.

Embodiments in which the liquid comprising MOF precursors is continuously deposited on the surface of the piezoelectric substrate are particularly advantageous in the event the film nebulises at the same rate at which the liquid comprising MOF precursors is deposited on the piezoelectric substrate. Accordingly, in some embodiments the acoustic waves cause the liquid comprising MOF precursors to nebulise at a rate that is substantially the same as the flow rate at which the liquid is deposited on the surface of the piezoelectric substrate.

The method of the invention can also be advantageously fast and efficient, and allows for a synthesis of MOFs that is significantly faster than conventional synthesis procedures. For example, MOF precipitation following the application of the electrical input may occur within less than about 5 hours, less than about 2.5 hours, less than about 1 hour, less than about 30 minutes, less than about 15 minutes, less than about 5 minutes, less than about 1 minute. In some embodiments, MOF precipitation following the application of the electrical input occurs within less than about 30 seconds, less than about 10 seconds, less than about 5 seconds, or less than about 1 second. For example, MOF precipitation following the application of the electrical input may occur within less than about 500 ms, less than about 250 ms, less than about 100 ms, less than about 50 ms, less than about 10 ms, or less than about 5 ms.

The present invention relates to a method of preparing a metal-organic framework (MOF).

Typically, MOFs are hybrid coordination structures formed by (i) metal ions or clusters of metal ions (e.g. metal oxides) coordinated by (ii) one or more multifunctional organic ligands or linkers. This results in the formation of highly ordered one-, two- or three-dimensional structures that can be highly porous.

The nature of the metal and organic linker dictates the structure, properties and potential applications of a given MOF. The described methods and device may be used for preparation of a range of different MOFs. MOFs according to the present invention include those having at least two metal clusters coordinated by at least one organic ligand, and the procedure of the invention may be used with a range of metal and organic ligands or linker precursors.

As used herein, the expression 'metal cluster' is intended to mean a chemical moiety that contains at least one atom or ion of at least one metal or metalloid. This definition embraces single atoms or ions and groups of atoms or ions that optionally include organic ligands or covalently bonded groups. Accordingly, the expression 'metal ion' includes, for example, metal ions, metalloid ions and metal oxides.

Suitable metal ions that form part of a MOF structure can be selected from Group 1 through 16 metals of the IUPAC Periodic Table of the Elements including actinides, and lanthanides, and combinations thereof. In some embodiments, the one or more types of metal precursors are selected from elements of groups Ia, IIa, IIIa, IVa to VIIIa and Ib and VIb of the Periodic Ta ble of the Elements.

Examples of suitable metal ions for use in the present invention include $Li^+$, $Na^+$, $K^+$, $Rb^+$, $Be^{2+}$, $Mg^{2+}$, $Ca^{2+}$, $Sr^{2+}$, $Ba^{2+}$, $Sc^{3+}$, $Y^{3+}$, $Ti^{4+}$, $Zr^{4+}$, $Hf^{4+}$, $V^{5+}$, $V^{4+}$, $V^{3+}$, $V^{2+}$, $Nb^{3+}$, $Nb^{5+}$, $Ta^{5+}$, $Cr^{6+}$, $Cr^{3+}$, $Mo^{6+}$, $Mo^{3+}$, $W^{6+}$, $W^{3+}$, $Mn^{4+}$, $Mn^{3+}$, $Mn^{2+}$, $Re^{7+}$, $Re^{2+}$, $Fe^{3+}$, $Fe^{2+}$, $Ru^{4+}$, $Ru^{3+}$, $Ru^{2+}$, $Os^{3+}$, $Os^{2+}$, $Co^{3+}$, $Co^{2+}$, $Rh^{3+}$, $Rh^{2+}$, $Rh^{+}$, $Ir^{4+}$, $Ir^{2+}$, $Ir^{+}$, $Ni^{2+}$, $Pd^{4+}$, $Pd^{2+}$, $Pt^{4+}$, $Pt^{2+}$, $Cu^{2+}$, $Cu^{+}$, $Ag^{+}$, $Au^{+}$, $Zn^{2+}$, $Cd^{2+}$, $Hg^{2+}$, $B^{3+}$, $Al^{3+}$, $Ga^{3+}$, $In^{3+}$, $Tl^{3+}$, $Si^{4+}$, $Si^{2+}$, $Ge^{4+}$, $Ge^{2+}$, $Sn^{4+}$, $Sn^{2+}$, $Pb^{4+}$, $Pb^{2+}$, $As^{5+}$, $As^{3+}$, $Sb^{5+}$, $Sb^{3+}$, $Bi^{5+}$, $Bi^{3+}$, $La^{3+}$, $Ce^{3+}$, $Ce^{4+}$, $Pr^{3+}$, $Pr^{4+}$, $Nd^{3+}$, $Sm^{3+}$, $Sm^{2+}$, $Eu^{3+}$, $Eu^{2+}$, $Gd^{3+}$, $Tb^{3+}$, $Tb^{4+}$, $Dy^{3+}$, $Ho^{3+}$, $Er^{3+}$, $Tm^{3+}$, $Tm^{2+}$, $Yb^{3+}$, $Yb^{2+}$, $Lu^{3+}$, $Th^{4+}$, $U^{6+}$, $U^{5+}$, $U^{4+}$, $U^{3+}$, and a combination thereof. In some embodiments, the MOF comprises one or more ion of Cu, Ni, Fe, Co, Zn, Mn, Ru, Mo, Cr, W, Rh and Pd.

The organic ligands include molecules that have at least two chemical moieties capable of coordinating a metal ion. In some embodiments, those chemical moieties comprise carboxylates, phosphonates, sulphonates, N-heterocyclic groups, and combinations thereof. For example, suitable organic ligands for use in the invention may be derived from oxalic acid, malonic acid, succinic acid, glutaric acid, phtalic acid, isophtalic acid, terephthalic acid, citric acid, trimesic acid, 1,2,3-triazole, pyrrodiazole, or squaric acid.

Organic ligands suitable for the purpose of the invention comprise organic ligands listed in WO 2010/075610 and Filipe A. Almeida Paz, Jacek Klinowski, Sergio M. F. Vilela, João P. C. Tomé, José A. S. Cavaleiro, João Rocha, 'Ligand design for functional metal-organic frameworks', *Chemical Society Reviews,* 2012, Volume 41, pages 1088-1110, the contents of which are included herein in their entirety.

In some embodiments, the MOF is a lanthanide (Ln) MOF, for example Er(bdc), Dy(bdc), Tb(bpdc), Gd(bpdc) and Tb(bpydc), Tb(bdc), Eu(bdc), Gd(bdc) or Ln(bpedc), in which bdc=1,4-benzenedicarboxylate, bpdc=4,4'-biphenyl-dicarboxylate and bpydc=2,2'-bipyridine-5,5'-dicarboxylate, and bpedc=biphenylethene-4,4'-dicarboxylate.

In some embodiments, the MOF is selected from mixed component MOFs, known as MC-MOFs. MC-MOFs have a structure that is characterised by more than one kind of organic ligand and/or metal. MC-MOFs can be obtained by using different organic ligands and/or metals directly in the liquid comprising MOF precursors, or by post-synthesis substitution of organic ligands and/or metals species of existing MOFs. Specific examples of MC-MOFs and corresponding synthesis methods can be found in A. D. Burrows, CrystEngComm 2011, Volume 13, pages 3623-3642, which content is included herein in its entirety.

In some embodiments, the MOF is a zinc imidazolate framework (ZIF). ZIFs are a sub-class of MOFs that are particularly suited to biologic applications thanks to (i) their prolonged stability in physiological conditions, (ii) the pH responsive nature of their metal-organic ligand bonds, which can be used as a trigger for pH-induced drug delivery applications, and (iii) negligible cytotoxicity. In addition, ZIFs can be synthesized in water and are chemically stable in water even at high temperatures (e.g. at boiling point) for prolonged periods (e.g. several weeks). The stability of ZIFs in water makes them preferred matrices for hosting bio-molecules for use in biologic environments.

ZIF frameworks feature tetrahedrally-coordinated transition metal ions (e.g. Fe, Co, Cu, Zn) connected by organic imidazolate organic ligands, resulting in three-dimensional porous solids. Similarly to zeolites, ZIFs have great thermal and chemical stability. Depending on the choice of precursors, many ZIF topologies can be synthesized.

Specific examples of ZIF and specific synthesis methods to produce them are reported in Rahul Banerjee, Anh Phan, Bo Wang, Carolyn Knobler, Hiroyasu Furukawa, Michael O'Keeffe, Omar M. Yaghi, 'High-Throughput Synthesis of Zeolitic Imidazolate Frameworks and Application to CO2 Capture', *Science, Vol* 319 (2008), 939-943 and corresponding Supporting Information.

Accordingly, MOFs useful for the purpose of the present invention may be selected from carboxylate-based MOFs, heterocyclic azolate-based MOFs, metal-cyanide MOFs. Specific examples of MOFs that may be suitable for use in the present invention include those commonly known in the art by the acronyms of CD-MOF-1, CD-MOF-2, CD-MOF-3, CPM-13, FJI-1, FMOF-1, HKUST-1, IRMOF-1, IRMOF-2, IRMOF-3, IRMOF-6, IRMOF-8, IRMOF-9, IRMOF-13, IRMOF-20, JUC-48, JUC-62, MIL-101, MIL-100, MIL-125, MIL-53, MIL-88, MOF-5, MOF-74, MOF-177, MOF-210, MOF-200, MOF-205, MOF-505, MOROF-2, MOROF-1, NOTT-100, NOTT-101, NOTT-102, NOTT-103, NOTT-105, NOTT-106, NOTT-107, NOTT-109, NOTT-110, NOTT-111, NOTT-112, NOTT-113, NOTT-114, NOTT-140, NU-100, rho-ZMOF, PCN-6, PCN-6', PCN9, PCN10, PCN12, PCN12', PCN14, PCN16, PCN-17, PCN-21, PCN46, PCN66, PCN68, PMOF-2(Cu), PMOF-3, SNU-5, SNU-15', SNU-21S, SNU-21H, SNU-50, SNU-77H, UiO-66, UiO-67, soc-MOF, sod-ZMOF, TUDMOF-1, UMCM-2, UMCM-150, UTSA-20, ZIF-2, ZIF-3, ZIF-4, ZIF-8, ZIF-9, ZIF-10, ZIF-11, ZIF-12, ZIF-14, ZIF-20, ZIF-21, ZIF-23, ZIF-60, ZIF-61, ZIF-62, ZIF-64, ZIF-65, ZIF-67, ZIF-68, ZIF-69, ZIF-70, ZIF-71, ZIF-72, ZIF-73, ZIF-74, ZIF-75, ZIF-76, ZIF-77, or ZIF-90.

In some embodiments, the metal ion is a copper ion and the organic ligand is trimesic acid. In those instances, the MOF is $Cu_3(1,3,5\text{-benzenetricarboxylate})_n$ (also known in the art as HKUST-1, or Cu-BTC). In some embodiments, the method of the invention can be performed such that the resulting $Cu_3(1,3,5\text{-benzenetricarboxylate})_n$ MOF has a distinctive and uncommon monoclinic (P21/n) crystal structure, with one-dimensional (1D) swordlike morphologies whose length significantly exceeds their vertical dimensions.

In some embodiments, the metal ion comprises an ion of iron (Fe). For example, the MOF may be obtained by combining iron chloride and a dicarboxylic ligand (e.g. fumaric acid, terephthalic acid, 6-naphthalenedicarboxylate, 4,4'-biphenyldicarboxylate, etc.). Accordingly, in some embodiments, the MOF is Fe-MIL-88/MIL-88 MOF.

In some embodiments, the metal iron comprises an ion of zirconium. In those instances, the MOF may therefore be a zirconium MOF, for example UiO-66. UiO-66 is a MOF having a structure in which $[Zr_6O_4(OH)_4]$ clusters are coordinated by 1,4-benzodicarboxylic acid struts.

In some embodiments, the MOF comprises ZIF-8. As it is known in the act, ZIF-8 is a zeolitic imidazolate framework made by zinc ions, each of which is coordinated by four imidazolate rings.

Typically, the MOF that forms in the process of the invention is crystalline. In a crystalline MOF the metal clusters are coordinated by the organic ligands to form a geometrically regular network made of repeating units of cluster/organic ligand arrangements.

A crystalline MOF generates diffraction patterns when characterized by commonly known crystallographic characterization techniques. These include, for example, X-ray powder diffraction (XPD), grazing incidence X-ray diffraction, small angle X-ray scattering (SAXS), single crystal X-Ray diffraction, electron diffraction, neutron diffraction and other techniques that would be known to the skilled person in the field of crystallography of materials.

The procedure of the invention is based on the provision of a liquid comprising MOF precursors. In that regard, MOF precursors suitable for use in the invention include those compounds known in the art that provide (i) the metal ions listed herein and (i) organic ligands of the kind described herein.

With regard to the metal ions, a suitable precursor compound may be a salt of the relevant metal ion. Examples in that regard include metal-chlorides, -nitrates, -acetates-sulphates, -hydrogen sulphates, -bromides, -carbonates, -phosphates, and derivatives thereof, including mono- and poly-hydrate derivatives.

Examples of suitable metal salt precursors include, but are not limited to, cobalt nitrate ($Co(NO_3)_2 \cdot xH_2O$), zinc nitrate ($Zn(NO_3)_2 \cdot xH_2O$), iron(III) nitrate ($Fe(NO_3)_3 \cdot xH_2O$), aluminium nitrate ($Al(NO_3)_3 \cdot xH_2O$), magnesium nitrate ($Mg(NO_3)_2 \cdot xH_2O$), calcium nitrate ($Ca(NO_3)_2 \cdot xH_2O$), beryllium nitrate ($Be(NO_3)_2 \cdot xH_2O$), europium nitrate ($Eu(NO_3)_3 \cdot xH_2O$), terbium nitrate ($Tb(NO_3)_3 \cdot xH_2O$), ytterbium nitrate ($Yb(NO_3)_3 \cdot xH_2O$), dysprosium nitrate ($Dy(NO_3)_3 \cdot xH_2O$), erbium nitrate ($Er(NO_3)_3 \cdot xH_2O$), gallium nitrate ($Ga(NO_3)_3 \cdot xH_2O$), gadolinium nitrate ($Gd(NO_3)_3 \cdot xH_2O$), nickel nitrate ($Ni(NO_3)_2 \cdot xH_2O$), lead nitrate ($Pb(NO_3)_2 \cdot xH_2O$), cadmium nitrate ($Cd(NO_3)_2 \cdot xH_2O$), manganese(II) nitrate ($Mn(NO_3)_2 \cdot xH_2O$), cobalt chloride ($CoCl_2 \cdot xH_2O$), zinc chloride ($ZnCl_2 \cdot xH_2O$), iron(III) chloride ($FeCl_3 \cdot xH_2O$), iron(II) chloride ($FeCl_2 \cdot xH_2O$), aluminium chloride ($AlCl_3 \cdot xH_2O$), magnesium chloride ($MgCl_2 \cdot xH_2O$), calcium chloride ($CaCl_2 \cdot xH_2O$), beryllium chloride ($BeCl_2 \cdot xH_2O$), europium chloride ($EuCl_3 \cdot xH_2O$), terbium chloride ($TbCl_3 \cdot xH_2O$), ytterbium chloride ($YbCl_3 \cdot xH_2O$), dysprosium chloride ($DyCl_3 \cdot xH_2O$), erbium chloride ($ErCl_3 \cdot xH_2O$), gallium chloride ($GaCl3 \quad xH_2O$), gadolinium chloride ($GdCl_3 \cdot xH_2O$), nickel chloride ($NiCl_2 \cdot xH_2O$), lead(II) chloride ($PbCl_2 \cdot xH_2O$), cadmium chloride ($CdCl_2 \cdot xH_2O$)), manganese(II) chloride ($MnCl_2 \cdot xH_2O$), cobalt acetate ($Co(CH_3COO)_2 \cdot xH_2O$), zinc acetate ($Zn(CH_3COO)_2 \cdot xH_2O$), iron(III) acetate ($Fe(CH_3Coo)_3 \cdot xH_2O$), iron(II) acetate ($Fe(CH_3Coo)_2 \cdot xH_2O$), aluminium acetate ($Al(CH_3COO)_3 \cdot xH_2O$), magnesium acetate ($Mg(CH_3Coo)_2 \cdot xH_2O$), calcium acetate ($Ca(CH_3Coo)_2 \cdot xH_2O$), beryllium acetate ($Be(CH_3Coo)_2 \cdot xH_2O$), europium acetate ($Eu(CH_3Coo)_3 \cdot xH_2O$), terbium acetate ($Tb(CH_3Coo)_3 \cdot xH_2O$), ytterbium acetate ($Yb(CH_3Coo)_3 \cdot xH_2O$), dysprosium acetate ($Dy(CH_3Coo)_3 \cdot xH_2O$), erbium acetate ($Er(CH_3Coo)_3 \cdot xH_2O$), gallium acetate ($Ga(CH_3Coo)_3 \cdot xH_2O$), gadolinium acetate ($Gd(CH_3Coo)_3 \cdot xH_2O$), nickel acetate ($Ni(CH_3Coo)_2 \cdot xH_2O$), lead(II) acetate ($Pb(CH_3COO)_2 \cdot xH_2O$), cadmium acetate ($Cd(CH_3COO)_2 \cdot xH_2O$)), manganese(II) acetate ($Mn(CH_3Coo)_2 \cdot xH_2O$), cobalt sulphate ($CoSO_4 \cdot xH_2O$), zinc sulphate ($ZnSO_4 \cdot xH_2O$), iron(III) sulphate ($Fe_2(SO_4)_3 \cdot xH_2O$), iron(II) sulphate ($FeSO_4 \cdot xH_2O$), aluminium sulphate ($Al_2(SO_4)_3 \cdot xH_2O$), magnesium sulphate ($MgSO_4 \cdot xH_2O$), calcium sulphate ($CaSO_4 \cdot xH_2O$), beryllium sulphate ($BeSO_4 \cdot xH_2O$), europium sulphate ($Eu_2(SO_4)_3 \cdot xH_2O$), terbium sulphate ($Tb_2(SO_4)_3 \cdot xH_2O$), ytterbium sulphate ($Yb_2(SO_4)_3 \cdot xH_2O$), dysprosium sulphate ($Dy_2(SO_4)_3 \cdot xH_2O$), erbium sulphate ($Er_2(SO_4)_3 \cdot xH_2O$), gallium sulphate ($Ga_2(SO_4)_3 \cdot xH_2O$), gadolinium sulphate ($Gd_2(SO_4)_3 \cdot xH_2O$), nickel sulphate ($NiSO_4 \cdot xH_2O$), lead sulphate ($PbSO_4 \cdot xH_2O$), cadmium sulphate ($CdSO_4 \cdot xH_2O$), manganese(II) sulphate ($MnSO_4 \cdot xH_2O$), cobalt hydroxide ($Co(OH)_2 \cdot xH_2O$), zinc hydroxide ($Zn(OH)_2 \cdot xH_2O$), iron(III) hydroxide ($Fe(OH)_3 \cdot xH_2O$), iron(III) oxide:hydroxide ($FeO(OH) \quad xH_2O$), Iron(II) hydroxide ($Fe(OH)_2 \cdot xH_2O$), aluminium hydroxide ($Al(OH)_3 \cdot xH_2O$), magnesium hydroxide ($Mg(OH)_2 \cdot xH_2O$), calcium hydroxide ($Ca(OH)_2 \cdot xH_2O$), beryllium hydroxide ($Be(OH)_2 \cdot xH_2O$), europium hydroxide ($Eu(OH)_3 \cdot xH_2O$), terbium hydroxide ($Tb(OH)_3 \cdot xH_2O$), ytterbium hydroxide ($Yb(OH)_3 \cdot xH_2O$), dysprosium hydroxide ($Dy(OH)_3 \cdot xH_2O$), erbium hydroxide ($Er(OH)_3 \cdot xH_2O$), gallium hydroxide ($Ga(OH)_3 \cdot xH_2O$), gadolinium hydroxide ($Gd(OH)_3 \cdot xH_2O$), nickel hydroxide ($Ni(OH)_2 \cdot xH_2O$), lead hydroxide ($Pb(OH)_2 \cdot xH_2O$), cadmium hydroxide ($Cd(OH)_2 \cdot xH_2O$), manganese(II) hydroxide ($Mn(OH)_2 \cdot xH_2O$), cobalt bromide ($CoBr_2 \cdot xH_2O$), zinc bromide ($ZnBr_2 \cdot xH_2O$), iron(III) bromide ($FeBr_3 \cdot xH_2O$), iron (II) bromide ($FeBr_2 \cdot xH_2O$), aluminium bromide ($AlBr_3 \cdot xH_2O$), magnesium bromide ($MgBr_2 \cdot xH_2O$), calcium bromide ($CaBr_2 \cdot xH_2O$), beryllium bromide ($BeBr_2 \cdot xH_2O$), europium bromide ($EuBr_3 \cdot xH_2O$), terbium bromide ($TbBr_3 \cdot xH_2O$), ytterbium bromide ($YbBr_3 \cdot xH_2O$), dysprosium bromide ($DyBr_3 \cdot xH_2O$), erbium bromide ($ErBr_3 \cdot xH_2O$), gallium bromide ($GaBr_3 \cdot xH_2O$), gadolinium bromide ($GdBr_3 \cdot xH_2O$), nickel bromide ($NiBr_2 \cdot xH_2O$), lead bromide ($PbBr_2 \cdot xH_2O$), cadmium bromide ($CdBr_2 \cdot xH_2O$), manganese(II) bromide ($MnBr2 \cdot xH_2O$), cobalt carbonate ($CoCO_3 \cdot xH_2O$), zinc carbonate ($ZnCO_3 \cdot xH_2O$), iron(III) carbonate ($Fe_2(CO_3)_3 \cdot xH_2O$), aluminium carbonate ($Al_2(CO_3)_3 \cdot xH_2O$), magnesium carbonate ($MgCO_3 \cdot xH_2O$), calcium carbonate ($CaCO_3 \cdot xH_2O$), beryllium carbonate ($BeCO_3 \cdot xH_2O$), europium carbonate ($Eu_2(CO_3)_3 \cdot xH_2O$), terbium carbonate ($Tb_2(CO_3)_3 \cdot xH_2O$), ytterbium carbonate ($Yb_2(CO_3)_3 \cdot xH_2O$), dysprosium carbonate ($Dy_2(CO_3)_3 \cdot xH_2O$), erbium carbonate ($Er_2(CO_3)_3 \cdot xH_2O$), gallium carbonate ($Ga_2(CO_3)_3 \cdot xH_2O$), gadolinium carbonate ($Gd_2(CO_3)_3 \cdot xH_2O$), nickel carbonate ($NiCO_3 \cdot xH_2O$), lead carbonate ($PbCO_3 \cdot xH_2O$), cadmium carbonate ($CdCO_3 \cdot xH_2O$), manganese(II) carbonate ($MnCO_3 \cdot xH_2O$), and mixtures thereof, where x ranges range from 0 to 12.

In some embodiments, the MOF precursors comprise one or more salts selected from a salt of Cu, Ni, Fe, Co, Zn, Mn, Ru, Mo, Cr, W, Rh and Pd. In an embodiment, the MOF precursors comprise Cu, salts and ions thereof. In an embodiment, the metal precursor is copper(II) nitrate. In an embodiment, the one or more types of metal precursor is Fe, salts and ions thereof.

With regard to the organic ligand, examples of organic ligand precursors include, but are not limited to, 4,4',4"-[benzene-1,3,5-triyl-tris(ethyne-2,1-diyl)]tribenzoate, biphenyl-4,4'-dicarboxylate, 4,4',4"-[benzene-1,3,5-triyl-tris(benzene-4,1-diyl)]tribenzoate, 1,3,5-benzenetribenzoate, 1,4-benzenedicarboxylate, benzene-1,3,5-tris(1H-tetrazole), 1,3,5-benzenetricarboxylic acid, terephthalic acid, imidazole, benzimidazole, 2-nitroimidazole, 2-methylimidazole (HmIm), 2-ethylimidazole, 5-chloro benzimidazole, purine, fumaric acid, α-cyclodextrin, β-cyclodextrin, γ-cyclodextrin 1,4-Bis(1-imidazolyl)benzene), 4,4'-Bispyridyl, 1,4-Diazabicyclo[2.2.2]octane, 2-amino-1,4-benzenedicarboxylate, 2-amino-1,4-benzenedicarboxylic acid, 4,4'-Azobenzenedicarboxylate, 4,4'-Azobenzenedicarboxylic acid, Aniline-2,4,6-tribenzoate, Aniline-2,4,6-tribenzic acid, Biphenyl-4,4'-dicarboxylic acid, 1,1'-Biphenyl-2,2',6,6'-tetracarboxylate, 1,1'-Biphenyl-2,2',6,6'-tetracarboxylic acid, 2,2'-Bipyridyl-5,5'-dicarboxylate, 2,2'-Bipyridyl-5,5'-dicarboxylic acid, 1,3,5-Tris(4-carboxyphenyl)benzene, 1,3,5-Tris(4-carboxylatephenyl)benzene, 1,3,5-Benzenetricarboxylate, 2,5-Dihydroxy-1,4-benzenedicarboxylate, 2,5-Dihydroxy-1,4-benzenedicarboxylic acid, 2,5-Dimethoxy-1,4-benzenedicarboxylate, 2,5-Dimethoxy-1,4-benzenedicarboxylic acid, 1,4-Naphthalenedicarboxylate, 1,4-Naphthalenedicarboxylic acid, 1,3-Naphthalenedicarboxylate, 1,3-Naphthalenedicarboxylic acid, 1,7-Naphthalenedicarboxylate, 1,7-Naphthalenedicarboxylic acid, 2,6 -Naphthalenedicarboxylate, 2,6-Naphthalenedicarboxylic acid, 1,5-Naphthalenedicarboxylate, 1,5-Naphthalenedicarboxylic acid, 2,7-Naphthalenedicarboxylate, 2,7-Naphthalenedicarboxylic acid, 4,4',4"-Nitrilotrisbenzoate, 4,4',4"-Nitrilotrisbenzoic acid, 2,4,6-Tris(2,5-dicarboxylphenylamino)-1,3,5-triazine, 2,4,6-Tris(2,5-dicarboxylatephenylamino)-1,3,5-triazine, 1,3,6,8-Tetrakis(4-carboxyphenyl)pyrene, 1,3,6,8-Tetrakis(4-carboxylatephenyl) pyrene, 1,2,4,5-Tetrakis(4-carboxyphenyl)benzene, 1,2,4,5-Tetrakis(4-carboxylatephenyl)benzene, 5,10,15,20-Tetrakis (4-carboxyphenyl)porphyrin, 5,10,15,20-Tetrakis(4-carboxylatephenyl)porphyrin, adenine, adeninate, fumarate, 1,2,4,5-benzenetetracarboxylate, 1,2,4,5-benzenetetracarboxylic acid, 1,3,5-benzenetribenzoic acid, 3-amino-1,5-benzenedicarboxylic acid, 3-amino-1,5-benzenedicarboxylate, 1,3-benzenedicarboxylic acid, 1,3-benzenedicarboxylate, 4,4',4"-[benzene-1,3,5-triyl-tris (ethyne-2,1-diyl)]tribenzoic acid, 4,4',4"-[benzene-1,3,5-triyl-tris(benzene-4,1-diyl)]tribenzoic acid, pyrazole, 2,5-dimethylpyrazole, 1,2,4-triazole, 3,5-dimethyl-1,2,4-triazole, pyrazine, 2,5-dimethylpyrazine, hexamethylentetraamine, nicotinic acid, nicotinate, isonicotinic acid, isonicotinate, 4-(3,5-dimethyl-1H-pyrazole)-benzoic acid, 2,5-furandicarboxylic acid, 2,5-furandicarboxylate, 3,5-dimethyl-4-carboxypyrazole, 3,5-dimethyl-4-carboxylatepyrazole, 4-(3,5-dimethyl-1H-pyrazol-4-yl)-benzoic acid, 4-(3,5-dimethyl-1H-pyrazol-4-yl)-benzoate, and mixtures thereof.

It will be understood that the organic ligands can also be functionalised organic ligands. For example, any one of the organic ligands listed herein may be additionally functionalised by amino-, such as 2-aminoterephthalic acid, urethane-, acetamide-, or amide-. The organic ligand can be functionalised before being used as precursor for MOF formation, or alternatively the assembled MOF itself can be chemically treated to functionalise its bridging organic ligands.

In some embodiments, the organic ligand is selected from mono-, di-, tri-, and tetravalent organic ligands, or a combination thereof. In some embodiments, the organic ligand is selected from trimesic acid, and 1,4-benzenedicarboxylic acid (BDC).

A skilled person will be aware of suitable chemical protocols that allow functionalizing MOFs with functional groups, either by pre-functionalizing organic ligands used to synthesize MOFs or by post-functionalizing pre-formed MOFs.

Suitable functional groups that may be provided on the MOF include —NHR, —N(R)$_2$, —NH$_2$, —NO$_2$, —NH (aryl), halides, aryl, aralkyl, alkenyl, alkynyl, pyridyl, bipyridyl, terpyridyl, anilino, —O(alkyl), cycloalkyl, cycloalkenyl, cycloalkynyl, sulfonamido, hydroxyl, cyano, —(CO)R, —(SO$_2$)R, —(CO$_2$)R, —SH, —S(alkyl), —SO$_3$H, —SO$^{3-}$M$^+$, —COOH, COO$^-$M$^+$, —PO$_3$H$_2$, —PO$_3$H$^-$M$^+$, —PO3$^{2-}$M$^{2+}$, —CO$_2$H, silyl derivatives, borane derivatives, ferrocenes and other metallocenes, where M is a metal atom, and R is C$_{1-10}$ alkyl.

In the context of the invention, the liquid comprising MOF precursors may be any composition of MOF precursors of the kind described herein that presents in liquid form, and from which MOF can precipitate upon interaction of the precursors.

For example, a liquid comprising MOF precursors for the purpose of the invention may be a solution resulting from dissolving MOF precursors of the kind described herein into a suitable solvent. Accordingly, in some embodiments the liquid comprising MOF precursors is a solution of MOF precursors. The solution of MOF precursors may be obtained using any solvent or mixture of solvents in which the metal and organic linker precursors of the kind described herein can be dissolved. Examples of suitable solvents in that regard include water, alcohols, carboxylic, nitrites, ketones, halogenated solvents, amines, amides, sulfoxides, aromatic and heteroaromatic solvents, and a mixture thereof. In some embodiments, the solvent is selected from methanol, ethanol, dimethyl sulfoxide (DMSO), acetone, water, dimethylformamide (DMF), and a mixture thereof. In some embodiments, the solvent comprises water. For example, the solvent may be a mixture of water and ethanol.

In some embodiments, the liquid comprising MOF precursors is an aqueous solution of MOF precursors, for example based on deionised water, or a physiological buffered solution (water comprising one or more salts such as KH$_2$PO$_4$, NaH$_2$PO$_4$, K$_2$HPO$_4$, Na$_2$HPO$_4$, Na$_3$PO$_4$, K$_3$PO$_4$, NaCl, KCl, MgCl$_2$, CaCl$_2$), etc.).

Provided the MOF forms, the liquid comprising MOF precursors may comprise any amount of MOF precursors.

In that regard, concentrations of MOF precursors in the liquid can include a range between about 0.001 M and 1 M, between about 0.01 M and 0.5 M, between about 0.01 M and 0.2 M, between about 0.02 M and 0.2 M, between about 0.02 M and 0.15 M, between about 0.05 M and 0.15 M, between about 0.08 M and 0.16 M. The values refer to concentration of organic ligand as well as concentration of metal salt, relative to the total volume of the liquid comprising the MOF precursors.

The organic ligand and metal iron precursor may be used according to any relative amount that is conducive to MOF formation. In some embodiments, the organic ligand to metal molar ratio may range from 60:1 to 1:60, from 30:1 to 1:30, from 10:1 to 1:10, from 5:1 to 1:5, from 2.5:1 to 1:2.5, from 2:1 to 1:2, or from 1.5:1 to 1:1.5. In some embodiments, the organic ligand to metal molar ratio is from 0.1:1 to 1:1, from 0.25:1 to 1:1, from 0.5:1 to 1:1, or from 0.75:1 to 1:1. For example, the organic ligand to metal molar ratio may be about 0.5:1.

The liquid comprising MOF precursors may be deposited on the surface of the piezoelectric substrate according to any means known to the skilled person. In that regard, the liquid may be deposited as a discrete volume of liquid in subsequent MOF production cycles, or continuously at a predetermined flow rate. In the latter case, the flow rate may be made to match the nebulisation rate of the liquid. In some embodiments, the liquid comprising MOF precursors is deposited on the surface of the piezoelectric substrate by a needle.

EXAMPLES

Example 1

Synthesis of Cu-BTC MOF

A device of the kind shown in FIG. 1 was made using a piezoelectric device made of a 127.68° Y—X lithium niobate substrate (LiNbO$_3$; Roditi Ltd., London, UK) for the production of Rayleigh SAW, on which a pair of 300 nm thick focused aluminium interdigitated transducers (IDTs) are patterned atop a 20 nm thick chromium layer using sputter deposition and standard UV photolithography.

The piezoelectric substrates were optically polished on both sides to render it transparent such that the interior of the fluid drop can be observed from the underside of the device to avoid optical distortion at the liquid-air interface of the drop when visualizing from above. Each IDT consists of 40 finger pairs with an aperture of 56 μm at the proximal end up to 210 μm at the distal end, such that application of a sinusoidal electrical signal through an RF signal generator (N9310A; Agilent Technologies, Santa Clara, CA, USA) and amplifier (10 W 1000 C; Amplifier Research, Souderton, PA, USA) at their resonant frequency of 30 MHz gives rise to a Rayleigh SAW with a wavelength of 100 µm. The piezo-electric substrate was inserted into a 50 ml Falcon tube (Sigma-Aldrich Pty. Ltd., Castle-Hill, New South Wales, Australia) for the produced nebulised mist to be collected.

0.420 g 1,3,5-benzenetricarboxylic acid ($C_6H_3 \cdot CO2H/3$ (BTC); Sigma Aldrich Pty. Ltd., Castle-Hill, NSW, Austra-lia) and 0.875 g copper(II) nitrate hemi(pentahydrate) (Cu ($NO_3)_2 \cdot 2.5H_2O$; Sigma Aldrich Pty. Ltd., Castle-Hill, NSW, Australia) were each dissolved in 12 ml of 1.1 (vol/vol) ethanol (Sigma Aldrich Pty. Ltd., Castle-Hill, NSW, Aus-tralia) and MilliQ® water (18.2 M·cm, Merck Millipore, Bayswater, VIC, Australia), and vortex spun for 10 min at 500 rpm until dissolved. The solutions were combined and the resulting solution introduced into a syringe. The syringe needle was inserted through an aperture of the tube, as shown in the schematic of FIG. 1. The solution of MOF precursors was then deposited onto the piezoelectric sub-strate to form a droplet at a distance from the IDTs.

An input voltage of 30 Vrms was used for the purpose of this example for the feedstock liquid to be nebulised off the device. Crystals of Cu-BTC MOF were observed to form and expelled from the piezoelectric substrate within milli-seconds of the application of the input voltage. The droplet of the MOF precursors' solution was seen to break into smaller droplets, which are ejected at high speeds leading to fast evaporation of the solvents and high local concentration of the precursors inside the droplet, resulting in formation of MOF crystals within milliseconds.

The acoustically-produced MOFs can be altered to have distinctively different properties. For example, the morphol-ogy of Cu-BTC has transformed from the cubic structure conventionally observed in solvo-thermal synthesis to an elongated sword-like (thin flat rod shape) morphology, as shown in FIGS. 3(a) and 3(b).

The thickness of the produced sword-like morphologies can be very thin, down to the monolayer limit (a few representative examples shown in FIG. 4), where the flake thickness can be modulated by employing different acoustic pulse periods, ranging from 10 ns to 2 seconds. These 2D-like structures have applications in energy storage and electronics, which is evident from the strong redox peaks that are observed in FIG. 10.

Example 2

10 MHz HYDRA devices of the kind described in Amgad R. Rezk et al., "HYbriD Resonant Acoustics (HYDRA)", *Advanced Materials*, Volume 28, Issue 10, pp. 1970-1975 (2016) were fabricated by patterning 40 interdigital trans-ducer (IDT) finger pairs comprising 10 and 400 nm thick chromium and aluminium films with 3.9 mm aperture widths on 500 m thick 1280 Y—X double-sided polished single-crystal piezoelectric lithium niobate ($LiNbO_3$) sub-strates (University Wafer Inc., South Boston, MA, USA) using UV lithography. The piezoelectric substrate was mounted in a system of the kind shown in the schematic of FIG. 2.

The acoustic waves in the form of SRBWs were excited by applying a sinusoidal electrical input at a resonant frequency ($f$=10 MHz) to the IDTs with a signal generator (SML01; Rhode & Schwarz, North Ryde, NSW, Australia) and amplifier (LYZ-22+, Mini Circuits, Brooklyn, NY, USA). $f$ is related to the SRBW wavelength $\lambda$ by $f=c/\lambda$, wherein c is the speed at which the acoustic wave propagates in LiNbO3; $\lambda$ is set by the pitch of the IDT fingers (spe-cifically, four times the finger width and gap).

0.420 g 1,3,5-benzenetricarboxylic acid ($C_6H_3 \cdot CO_2H)_3$ (BTC); Sigma Aldrich Pty. Ltd., Castle-Hill, NSW, Austra-lia) and 0.875 g copper(II) nitrate hemi(pentahydrate) (Cu ($NO_3)_2 \cdot 2.5H_2O$; Sigma Aldrich Pty. Ltd., Castle-Hill, NSW, Australia) were each dissolved in 12 ml of 1:1 (vol/vol) ethanol (Sigma Aldrich Pty. Ltd., Castle-Hill, NSW, Aus-tralia) and MilliQ® water (18.2 M·cm, Merck Millipore, Bayswater, VIC, Australia), and vortex spun for 10 min at 500 rpm until dissolved.

In accordance with a setup as shown in the schematic of FIG. 2, 10 mL of each of these precursor solutions were then delivered using a dual-syringe pump at a flow rate of 0.3 mL/min via a 24-gauge syringe needle that is mounted so the fluid it dispenses flows out into the middle of the device. Upon turning on the acoustic excitation, a thin acoustowet-ting film comprising both precursor solutions is drawn from the needle. The film was observed to spread along the surface of the piezoelectric substrate before being nebulized.

All experiments were carried out at a fixed voltage input of 26 Vrms. The voltage input was delivered under continu-ous wave excitation or pulsed modulation (50% duty cycle) with different pulse durations of 0.1 ms, 100 ms and 400 ms. MOF crystals were observed to nucleate and crystallize within the film, following which they were ejected along with the nebulized aerosols and subsequently collected in 50 mL centrifuge tubes. The resulting precipitate containing the crystals was thrice centrifuged for 10 min at 3000 rpm, and subsequently washed in 60 ml of a 1:1 (vol/vol) ethanol/MilliQ® water solution. After the final wash, the precipi-tated crystals were suspended in 20 ml MilliQ® water unless drying was required. A control sample of the same precursor concentrations was also delivered at the same flow rate via the same syringe pump to the surface of the device although in the absence of the acoustic excitation. The solution was then left to evaporate to allow crystallization to occur, through which a blue crystalline powder was obtained. The powder was then thrice washed in 60 ml of a 1:1 (vol/vol) ethanol/water solution, and reconstituted in 20 ml MilliQ® water for further characterization.

Once the liquid containing the Cu-BTC precursors, namely, copper(II) nitrate hemi(pentahydrate) ($Cu(NO_3)_2 \cdot 2.5H_2O$) and 1,3,5-benzenetricarboxylic acid ($C_6H_3 \cdot CO_2H_3$), from the dual syringe pump contacts the surface of the HYDRA device, the SRBW, which is launched from the interdigitated transducer (IDT) electrode and propagates along the surface of the piezoelectric sub-strate, draws the liquid into a film such that it spreads along the surface of the device. The dimension of the thin film that is formed is somewhat dependent on the pulse duration, and has a strong influence on the intensity (i.e., amplitude) and resonant frequency (and hence the wavelength) of the stand-ing capillary waves imposed on its free surface as a conse-quence of the underlying substrate vibration. This, in turn, has a direct effect on the corresponding thickness of the MOF crystals that are generated within the film, as observed in the atomic force microscopy (AFM) profiles in FIGS. 4(a)-4(d) for a fixed input power to the device, thus alluding to the role of the film hydrodynamics and capillary wave resonant dynamics in the MOF production and hence its potential to be tuned; given the typical millisecond order residence time of the film on the device as it spreads prior to being nebulized, we note that the crystallization of the MOFs occurs rather rapidly.

Example 3

The collected MOF crystals were deposited on atomic force microscopy (AFM) mica discs (10 mm diameter, Ted Pella Inc., Redding, CA, USA) glued onto an AFM metal disc (15 mm diameter, Ted Pella Inc., Redding, CA, USA) by drop casting 10 μL of the sample and leaving it to air dry for 10 min, following which they were examined under contact mode AFM (Multimode 8 with PeakForce Tunnelling (TUNA™) module; Bruker Corp., Santa Barbara, CA, USA). The AFM images that were obtained were first flattened at a z-threshold of 0.5 nm, from which the layer thickness and lateral size distributions across 512 bins were acquired by analyzing at least 200 crystals using the supplied software (NanoScope, v6.13; Bruker Corp., Santa Barbara, CA, USA).

Scanning electron microscopy (SEM) imaging (Philips XL30; FEI, Hillsboro, OR, USA) was employed to characterize the morphology of the MOF crystals. Briefly, the crystals were deposited on a silicon wafer above which a 5 nm gold layer was sputtered for 60 s. Imaging was subsequently carried out at 10 kV. The size of the MOF crystals was determined through visual inspection of approximately 100 crystals from the SEM digital images using ImageJ (v1.34, National Institutes of Health, Bethesda, MD, USA).

The structure of the crystals that were synthesized were determined using powder X-ray diffraction ((XRD) D8 Advance; Bruker Pty. Ltd., Preston, VIC, Australia) under Cu K-α radiation at 40 mA and 40 kV ($\lambda$=1.54 Å) with a scan rate of 2°/min, step size of 0.02°, and a 2θ range of 6° to 90°. Single crystal diffraction data for structure resolution were collected using a diffractometer (Apex Duo; Bruker Pty. Ltd., Preston, VIC, Australia) using monochromated Mo K-α radiation ($\lambda$=0:71069 Å) and a CCD camera (Apex II; Bruker Pty. Ltd., Preston, VIC, Australia) as an area detector. Structure solution and Rietvield refinement was performed using the SHELXTL package (Bruker Pty. Ltd., Preston, VIC, Australia), and matched against crystal structure files obtained from the Cambridge Crystal-Ahmed et al.: *Preprint submitted to Elsevier* Page 3 of 12 Acoustowetting Assembly of One-Dimensional Swordlike Metal-Organic Framework Crystals lographic Data Center (CCDC data card number 987920; Cambridge, UK). The calculated XRD patterns were obtained using the Mercury Crystal Visualisation Software package (v3.8; Cambridge Crystallographic Data Center, Cambridge, UK).

Figure 5:
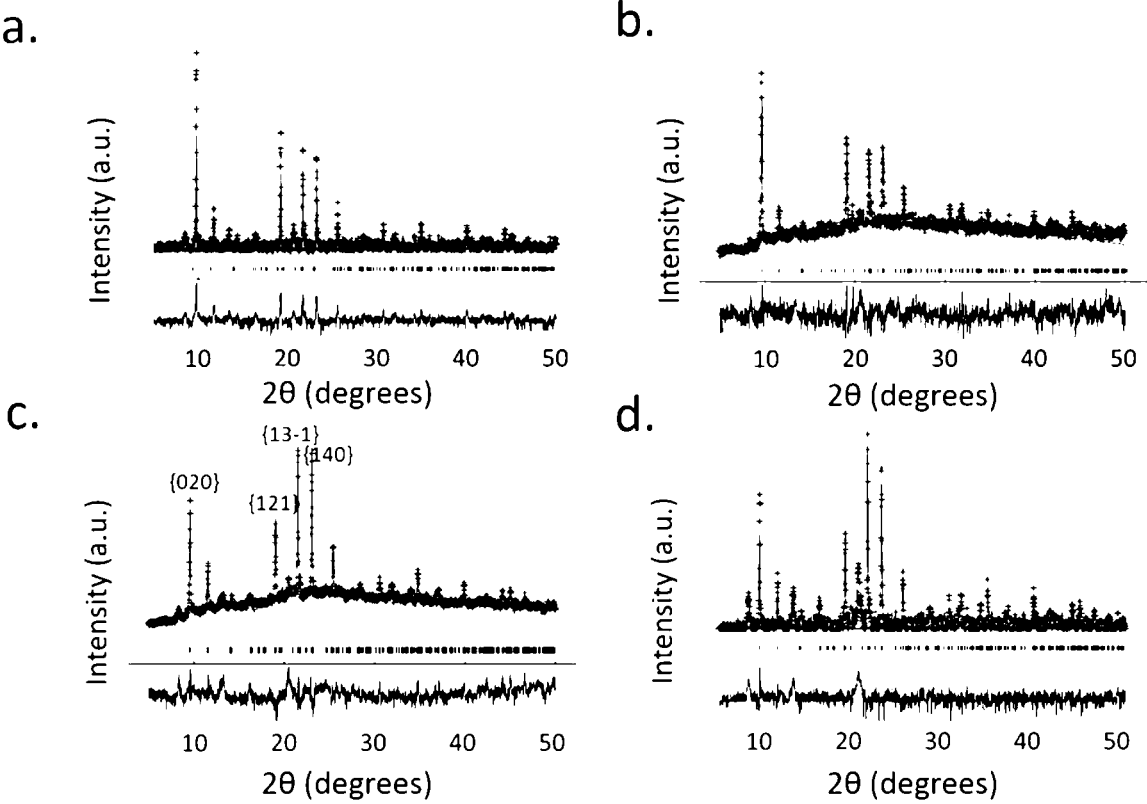
FIG. 5 shows single crystal X-Ray Diffraction (XRD) analysis showing Rietveld refinement of the crystals synthesized under (a) continuous acoustic excitation, and (b) 0.1 ms, (c) 100 ms, and (d) 400 ms pulse durations.

FIG. 5 shows single crystal x-ray diffraction analysis showing Rietveld refinement of the crystals synthesized under (a) continuous (blue) acoustic excitation, and, (b) 0.1 ms (red), (c) 100 ms (green), and (d) 400 ms (purple) pulse durations, showing monoclinic P2₁/n crystal structures. The decrease in the relative intensity of the {020} crystal plane in comparison to the increase in intensities of the (121), (131) and (140) crystal planes indicate an increase in crystal thickness for those obtained under the 100 ms and 400 ms pulse durations.

Figure 3:
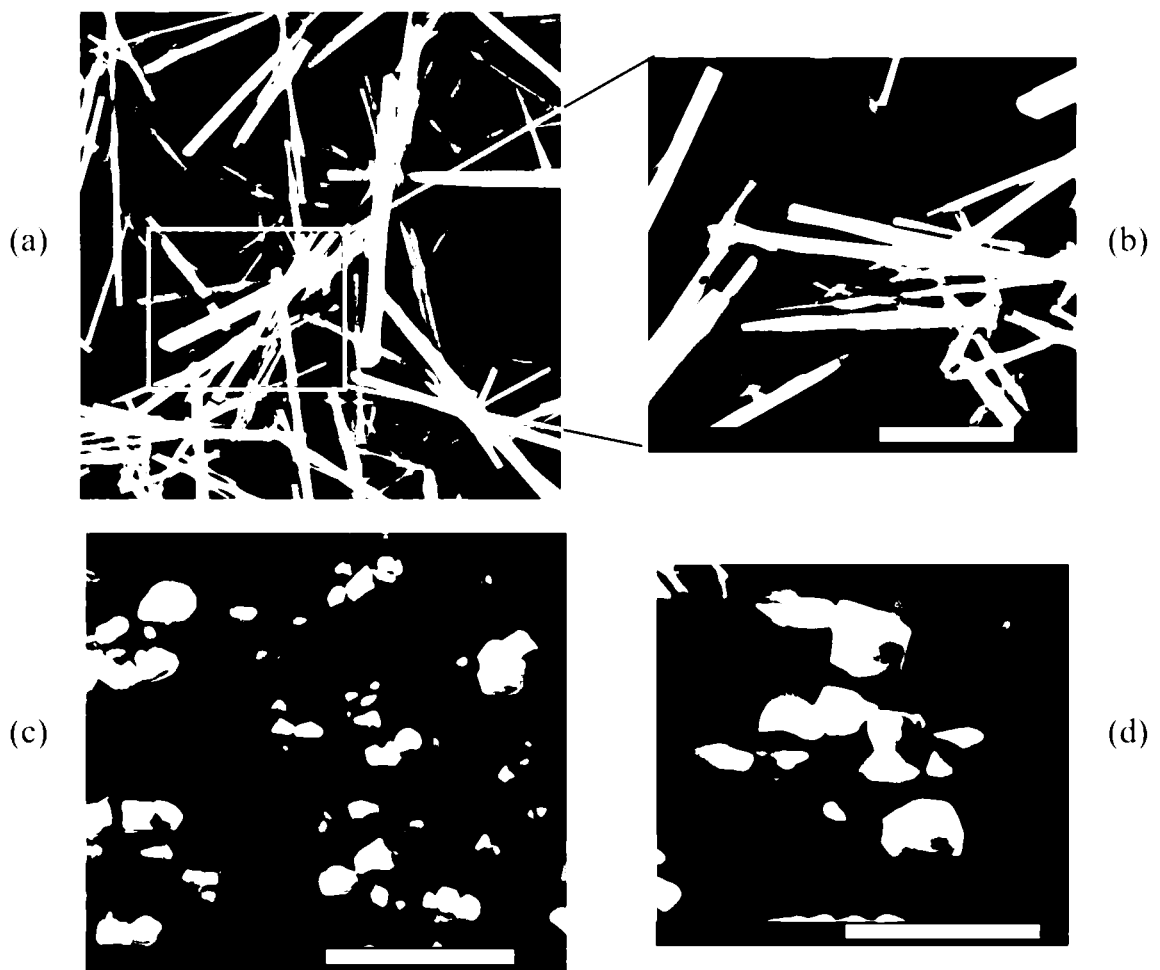
FIG. 3 shows MOF synthesised using Surface Reflected Bulk Waves (SRBWs) with sword-like morphology ((a), (b)) in accordance with an embodiment of the invention, compared to the corresponding MOF formed by conventional solvothermal bulk synthesis ((c), (d)). Scale bar in FIGS. 3(b) and 3(d) is 20 μm, scale bar in FIG. 3(c) is 50 μm.
Figure 4:
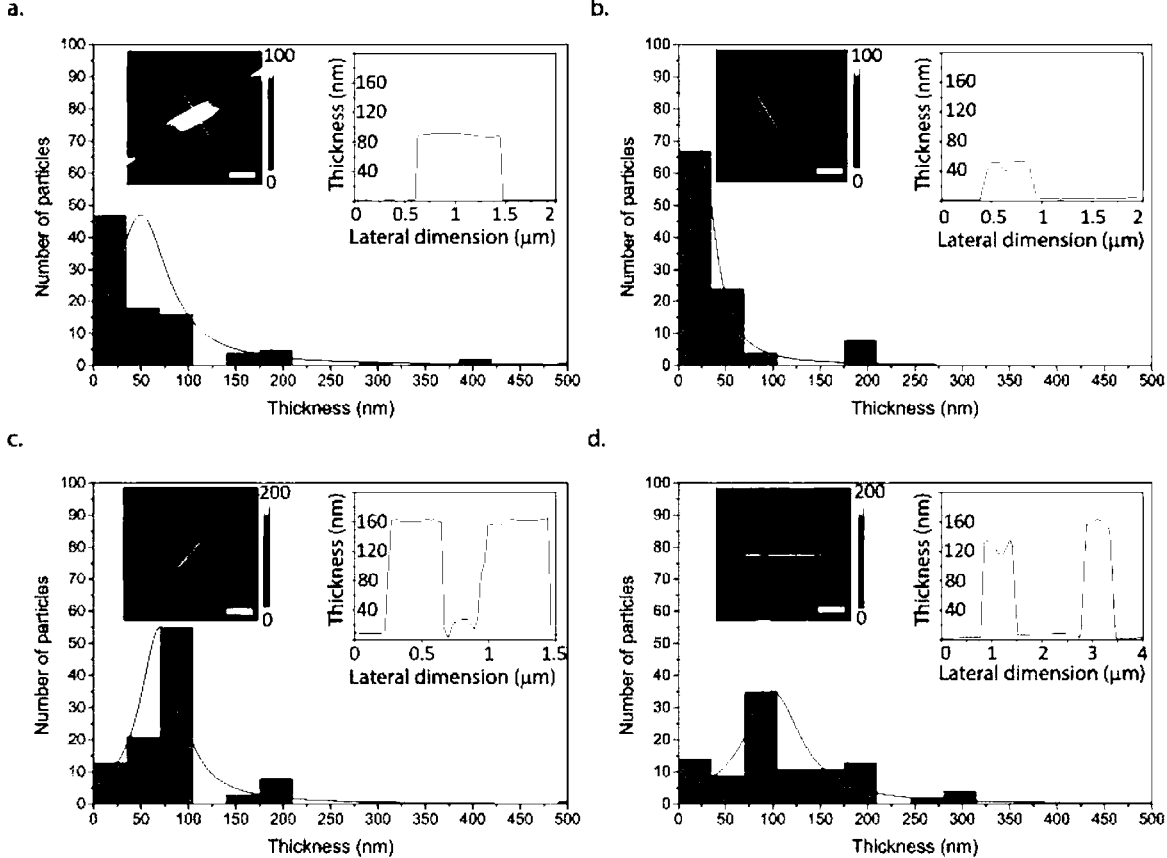
FIG. 4 shows Atomic Force Microscopy (AFM) characterization of samples obtained under different SRBW excitation pulse periods, under (a) continuous exposure to SRBW, and under pulsed modulation with pulse durations of (b) 0.1, (c) 100, and (d) 400 ms.
Figure 6:
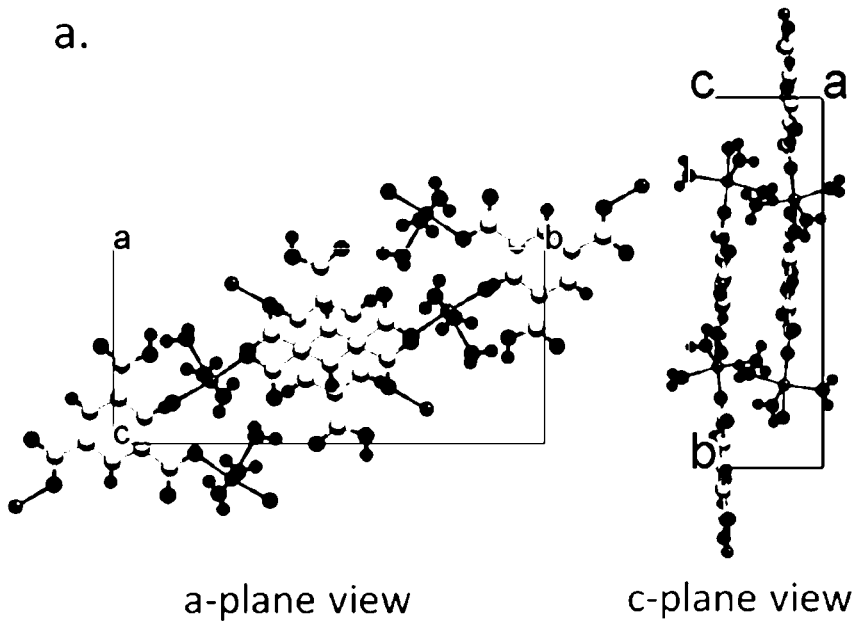
FIG. 6 shows crystal structure models obtained from single crystal diffraction data of (a) the P21/n monoclinic Cu-BTC MOF crystal with swordlike morphology as obtained in an embodiment of the invention, as viewed from the (100) and (111) crystal planes, and (b) conventional $Fm_3m$ cubic morphology of HKUST-1 crystals synthesized using conventional bulk solvothermal technique.
Figure 6:
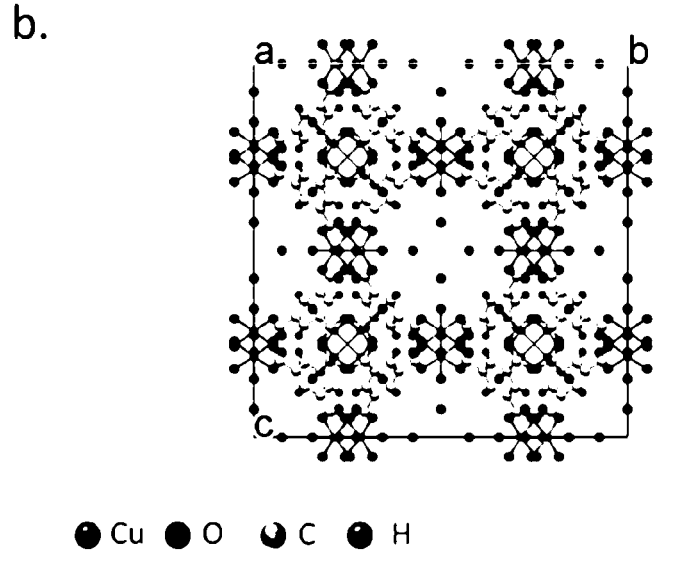

FIG. 6 shows crystal structure models obtained from single crystal diffraction data of 6(a) the P21/n monoclinic Cu-BTC MOF crystal with swordlike morphology obtained according to an embodiment of the invention and shown in FIGS. 3-4, as viewed from the (100) and (111) crystal planes, and, 6(b) the conventional Fm3m cubic morphology of the HKUST-1 crystals synthesized using the bulk solvothermal technique (control). XRD data of the crystals synthesized under all of the conditions tested reveal primitive monoclinic crystal structures with a P21/n space-group and corresponding cell parameters a=6:7590 Å, b=18:8403 Å, c=8:5206 Å, $\alpha$=$\gamma$=90°, $\beta$=92.406°, and chemical composition $C_9H_{10}O_9$ Cu, with coordinated termination of the exposed Cu moieties (FIG. 6(a)).

Interestingly, we observe a relative reduction in the in-plane (i.e., the (020) plane) intensity in comparison to an increase in the out-of-plane (i.e., the (121), (131) and (140) planes) intensity, confirming the increase in crystal thickness at 100 ms and 400 ms pulse durations (FIG. 5). In contrast, the control sample that was produced using conventional bulk solvothermal synthesis yielded the 3D cubic morphology with face-centered (Fm3m) space group and cell parameters a=b=c=26.343 Å, $\alpha$=$\beta$=$\gamma$=90° typically reported in the literature (FIGS. 3(c) and (d)), commonly known as HKUST-1.

Fourier Transform Infrared (FTIR) spectroscopy analysis of the samples at room temperature was carried out using a spectrophotometer (Spectrum One; PerkinElmer Inc., Waltham, MA, USA) by placing a 10 μL suspension of the crystals on a diamond substrate, from which transmittance measurements were conducted in the wavenumber range between 500 and 4000 cm⁻¹. The thermal properties of the crystals, on the other hand, were analyzed through thermogravimetric analysis ((TGA) *Pyrus* 1; PerkinElmer Inc., Waltham, MA, USA). Specifically, 7.5 mg of the crystals were placed in an aluminium pan held at 50° C. for 5 min prior to being heated at a rate of 10° C. min*1 under N2 from 35° C. to 800° C.

Figure 7:
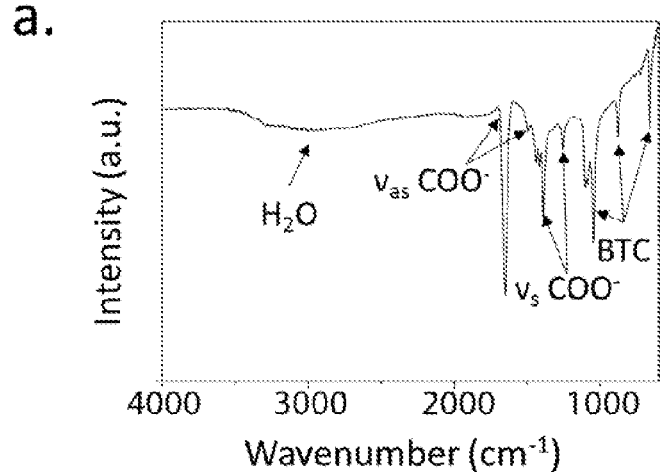
FIG. 7 shows Fourier Transform Infrared (FTIR) spectra of (a) swordlike Cu-BTC crystals synthesized according to an embodiment of the invention, and (b) cubic HKUST-1 crystals synthesized using conventional bulk solvothermal technique.
Figure 7:
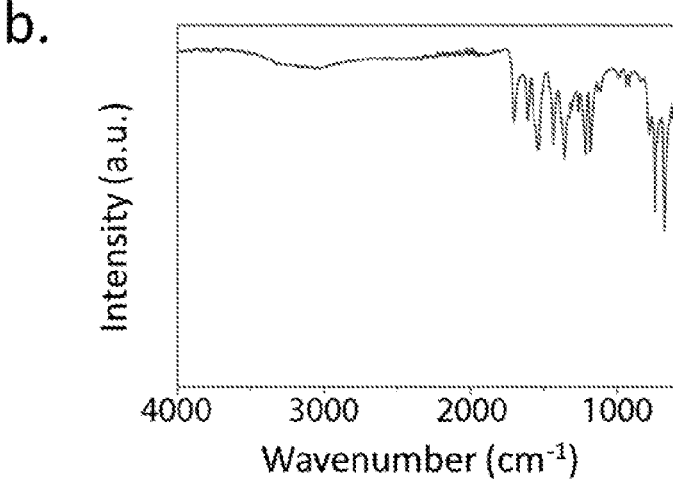

The FTIR spectra for the synthesized crystals (FIG. 7(a)) further verified the coordination of $H_2O$ molecules in the crystal structure as seen by its characteristic broad peak at 3600-3500 cm⁻¹. The appearance of the peaks associated with the asymmetric stretching of the carboxylate groups in the Cu-BTC molecules at 1508-1623 cm⁻¹, the symmetric stretching of the COO—Cu carboxylate groups at 1384 and 1405 cm⁻¹, and the various bands attributed to the out-of-plane vibration of the BTC ligand over 1300-600 cm⁻¹ provides further confirmation of the structure; we note, however, that the infrared (IR) modes associated with Cu below 600 cm⁻¹ are out of the detectable range for the system employed. FIG. 7(b) shows the cubic HKUST-1 control crystals synthesized using the bulk solvothermal method.

In general, the MOFs possessed elongated 1D swordlike morphologies (see, for example, the representative images in FIGS. 3(a) and 3(b)) compared to the regular 3D cubic crystals that are formed in the absence of the acoustic excitation through conventional bulk solvothermal synthesis (FIGS. 3(c) and 3(d)). In particular, the lattice motifs can be seen to grow preferentially along the lateral in-plane direction to form the crystals While their average widths, approximately 7 μm±2 μm, and lengths, around 70, 25 μm, do not vary considerably, the thicknesses of the swordlike structures can be seen from FIGS. 4(a)-(d) to decrease as the pulse duration is increased from continuous operation (limit of zero pulse width) where the average thickness is approximately 50, 10 nm (FIG. 4(a)) to an optimum of around 30, 15 nm at a pulse duration of 0.1 ms (FIG. 4(b)); this optimum pulse duration is associated with the case where the rate at which the liquid is delivered to the piezoelectric substrate roughly matches the rate at which it leaves the piezoelectric substrate via nebulization such that the residence time of the film on the piezoelectric substrate is minimized. With longer pulse durations above this minimum film residence time, the average thickness is however seen to increase (FIGS. 4(c) and 4(d)).

Figure 8:
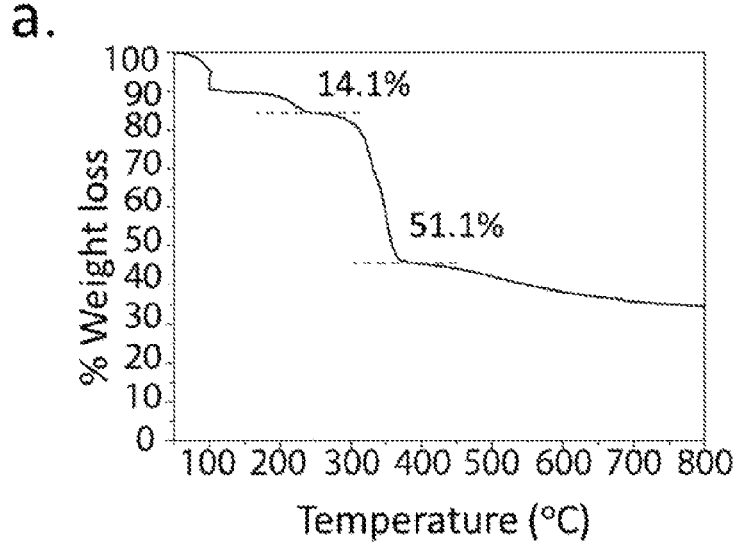
FIG. 8 shows Thermal Gravimetric Analysis (TGA) curves for (a) swordlike Cu-BTC crystals synthesized according to an embodiment of the invention, and (b) cubic HKUST-1 crystals synthesized using conventional bulk solvothermal technique.
Figure 8:
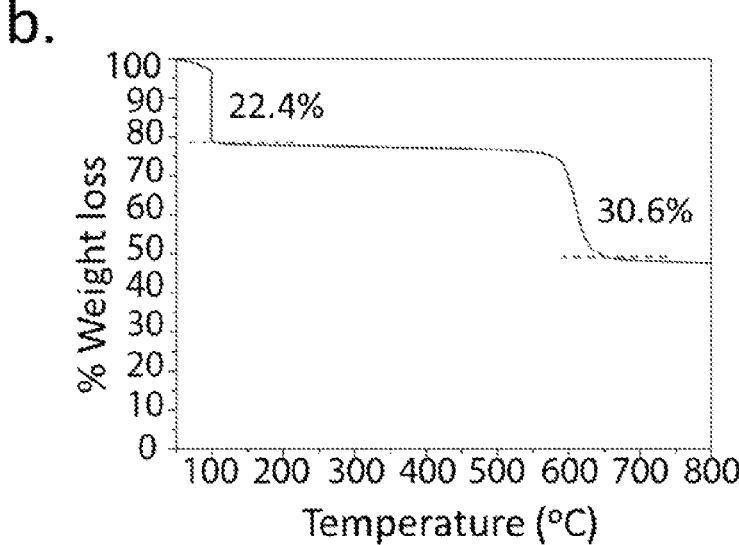

To confirm its structure, thermogravimetric analysis (TGA) of the crystals obtained from the acoustic templating technique (FIG. 8(a)) showed an initial weight loss occurring at 75° C., which can be attributed to the release of two out of the three $Cu^{2+}$ coordinated $H_2O$ molecules. The loss of the third coordinated $H_2O$ molecule within the structure is associated with a further weight loss observed at 205° C. The total weight loss observed for all three coordinated $H_2O$ molecules is 14.1%. The 51.1% weight loss observed at the onset of 270° C. corresponds to the loss of the BTC ligand. The remaining mass can be attributed to Cu (calculated to be 15.1%) and the degraded sample, with an observed mass of 27.5% at 800° C. These weight losses correspond to a 3:1:1 ratio between the $H_2O$ molecules, Cu, and BTC, respectively. These results strongly agree with the crystal structure of the network. FIG. 8(b) shows TGA of conventional cubic HKUST-1 crystals synthesized using a conventional solvothermal method, for comparison.

Example 4

The electrocatalytic activity of the as synthesized MOFs were evaluated for their performance for Hydrogen Evolution Reaction (HER) using a standard three-electrode cell system in 0.5 M $H_2SO_4$ electrolyte solution bubbled with $N_2$ gas. Activated carbon and saturated calomel electrodes (SCE) were used as the counter and reference electrodes, respectively. The working electrodes, on the other hand, consisted of 3 mm diameter glassy carbon electrodes (GCEs) on which the synthesized MOFs were deposited. Briefly, 4 mg of Cu-BTC MOFs were added to 200_1 Nafion™ (5 wt %; Sigma Aldrich Pty. Ltd., Castle-Hill, NSW, Australia), and the mixture vortexed at 500 rpm and sonicated to form a homogeneous solution. 5 μL of the solution mixture was then drop casted onto the surface of the GCE and dried at room temperature. The electrode potential was adjusted with respect to the reversible hydrogen electrode (RHE) according to ERHE=ESCE+0:241+0:059 pH at 25° C. Linear sweep voltammetry was carried out in the range *0:6 to *0:2 V (vs. RHE) at a scan rate of 2 mV s*1.

Figure 9:
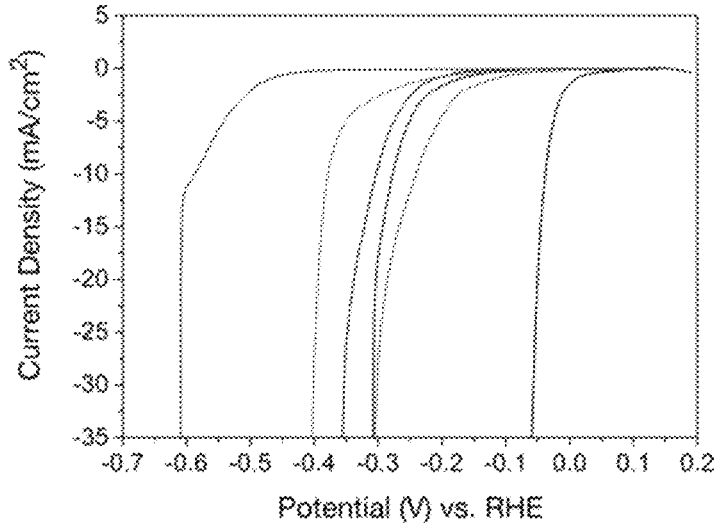
FIG. 9 shows (a) Hydrogen Evolution Reaction (HER) polarization curves and (b) corresponding Tafel plots relative to various Cu-BTC swordlike crystals synthesized according to an embodiment of the invention at different pulse length, compared to a platinum electrode used as the working electrode, and HKUST-1 crystals synthesized using conventional bulk solvothermal technique.
Figure 9:
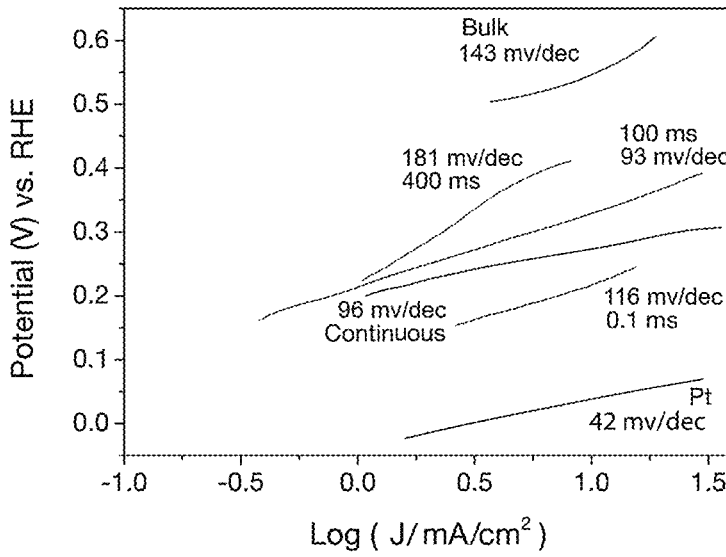

It can be seen from the calculated Tafel plots in FIG. 9 that were obtained from linear sweep voltammetry measurements that the onset potentials were significantly enhanced with decreasing crystal thicknesses (values of 109, 44, 143 and 148 mV for the onset potentials and Tafel slopes ranging between 93-116 mV/dec were obtained for crystals produced under continuous and 0.1 ms, 100 ms and 400 ms pulse durations, respectively). In contrast, the control electrode made from conventional cubic bulk Cu-BTC crystals showed inferior HER performance with an onset potential of 418 mV (as shown in Table 1 below).

TABLE 1

| Comparative voltammetry data of Cu-BTC MOFs | | | | |
|---|---|---|---|---|
| Sample | Onset Potential (mV) | Overpotential ($\eta_{10}$) (mV) | Tafel Slope (mV/dec) | $R^2$ |
| Pt | 0 | 39.7 | 42.4 | 0.9984 |
| Cubic HKUST-1 | 418.5 | 587.9 | 142.8 | 0.9859 |
| Continuous | 109.1 | 276.7 | 96.3 | 0.9954 |
| 0.1 ms | 44.2 | 238.9 | 115.5 | 0.9948 |
| 100 ms | 142.8 | 302.6 | 92.9 | 0.9989 |
| 400 ms | 158.4 | 378.2 | 180.9 | 0.9967 |

From these results, it is reasonable to infer that the superior electrochemical performance of the 1D swordlike crystals obtained using the current acoustic templating technique can be attributed to the large surface area of the 1D swordlike structures with open Cu(II) active coordination sites that can act as Lewis acids that facilitate coordination of the water molecules, which, in turn, enhances electron transfer along the linear path of the 1D crystals. As a consequence, a significant (approximately 75-fold) improvement in the proton conductivity for HER and a current density of 10 mA/cm2 at a low overpotential 10 of 239 mV produced at 0.1 ms-consistent with similar claims in the literature for thin MOFs possessing exposed metal sites and considerably lower than that obtained for 3D cubic HKUST-1 is observed.

Figure 10:
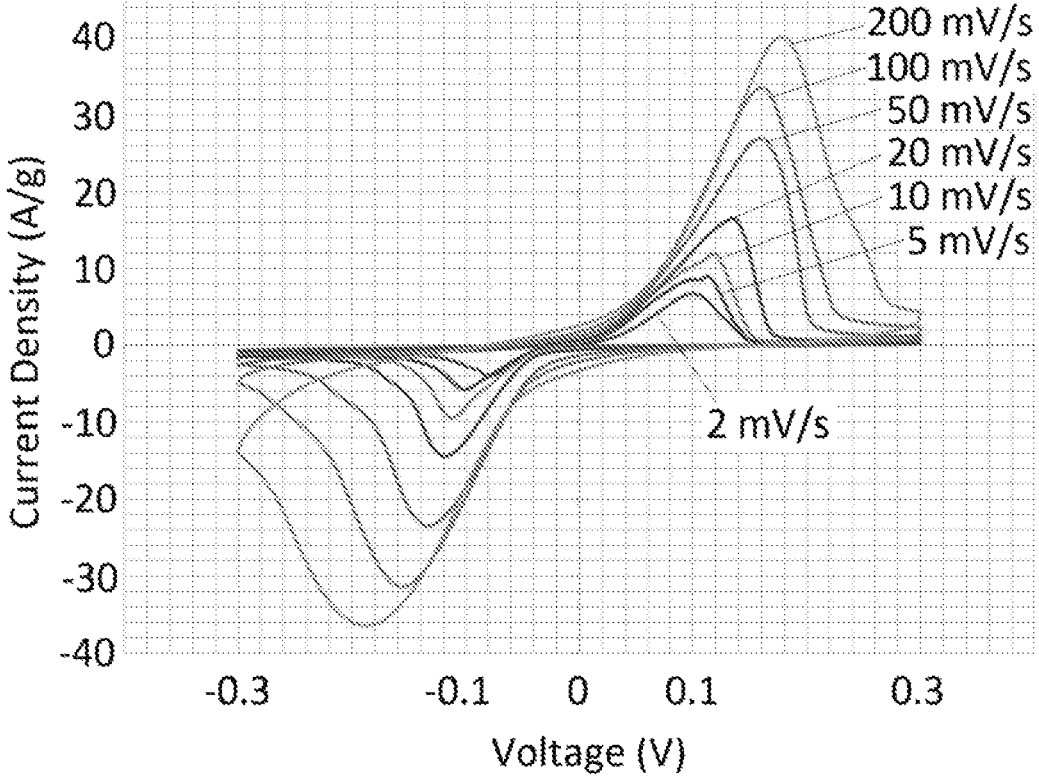
FIG. 10 shows a representative Current-Voltage (CV) characterization of a MOF produced in accordance to an embodiment of the invention, demonstrating strong redox peaks.

The MOF structures obtained by the method of the invention can have applications in energy storage and electronics, which is evident from the strong redox peaks that are observed in FIG. 10.

Every formulation or combination of components described or exemplified can be used to practice the invention, unless otherwise stated. Specific names of compounds are intended to be exemplary, as it is known that one of ordinary skill in the art can name the same compounds differently.

Example 5

Cu-BTC (HKUST-1) MOF was produced in accordance to the method described herein and deposited (sprayed) on various target surfaces. The target surfaces included cotton, paper (e.g. paper stickers for use as food label sensors).

10 MHz HYDRA devices were fabricated by patterning 40 interdigital transducer (IDT) finger pairs comprising 10 and 400 nm thick chromium and aluminium films with 3.9 mm aperture widths on 500 um thick 128° double-sided polished single-crystal piezoelectric lithium niobate substrates using UV lithography. Acoustic waves (SRBWs) were generated by applying a sinusoidal electrical input at the resonant frequency (f=10 MHz) to the IDTs with a signal generator and amplifier.

0.420 g 1,3,5-benzenetricarboxylic acid (BTC) and 0.875 g copper(II) nitrate hemi(pentahydrate) were each dissolved in 12 ml of 1:1 (vol/vol) ethanol (Sigma Aldrich Pty. Ltd., Castle-Hill, NSW, Australia) and MilliQ water, and vortex spun for 10 min at 500 rpm until dissolved. As schematically depicted in FIG. 1, 10 ml of each of these precursor solutions were then delivered using a dual-syringe pump at a flow rate of 0.3 ml/min via a 24-gauge syringe needle that is mounted so the fluid it dispenses flows out into the middle of the device. Upon turning on the acoustic excitation, a thin film comprising both precursor solutions is drawn from the needle, which subsequently spreads along the surface of the substrate and is nebulized. A substrate of a piece of paper or cotton cloth was cut at a size of 2×2 cm and placed at a distance of 10 cm on top of the SAW nebulizer.

Nebulization of 12 ml total solution volume at 0.3 ml/min corresponded to a MOF spray time of about 40 minutes. MOFs sprayed on cellulose paper stickers have been used for the optical detection of ammonia. While as deposited HKUST-1 is light blue, it was observed to assume purple tones upon exposure to ammonia vapors.

Example 6

MOF dimensions can be tuned based on the pulse duration being either above or below an optimum value. An example of how pulse duration correlates to the geometric characteristics of the acoustowetting film and those of the resulting MOF crystals is shown in FIGS. 11 and 12. The figures relate to data obtained from Cu-BTC (HKUST-1) MOF crystals produced in accordance to the method described above.

FIG. 11 shows the correlation between the average thicknesses of the sword-like Cu-BTC MOF crystals (data circles) and the thickness of the acoustowetting liquid film (data squares) for different pulse durations (0.0001, 0.1, 100 and 400 ms).

FIG. 12 shows the correlation between the average thicknesses of the sword-like Cu-BTC MOF crystals (data circles) and the resultant surface area to volume ratio (data squares) of the crystals obtained using different pulse durations (0.0001, 0.1, 100 and 400 ms).

Data points plotted in FIGS. 11 and 12 are reported in Table 2 below.

TABLE 2

| Data points of plots of FIGS. 11 and 12 | | | | | | |
|---|---|---|---|---|---|---|
| Pulse Duration (ms) | Width (μm) | Length (μm) | Thickness (μm) | Volume (μm³) | Surface Area (μm²) | Surface Area to Volume Ratio |
| 0.0001 | 7 | 70 | 0.06 | 29.4 | 989.24 | 33.6 |
| 0.1 | 7 | 70 | 0.03 | 14.7 | 984.62 | 67.0 |
| 100 | 7 | 70 | 0.15 | 73.5 | 995.4 | 13.5 |
| 400 | 7 | 70 | 0.160 | 78.4 | 991.55 | 12.6 |
| Bulk | 4 | 4 | 4 | 64 | 16 | 0.25 |

The case of continuous excitation is equivalent to a short pulse duration of 0.0001 ms given the 10 MHz SRBW excitation frequency. It can therefore be seen that a maximum in the surface area to volume ratio of the crystal can be found at an optimum pulse duration of 0.1 ms. In the figures, trend lines have been added for ease of visualization only, and do not represent interpolation curves.

Example 7

Control over the morphology of MOF affords access to morphologies that are not obtained through conventional MOF synthesis (e.g. solvothermal synthesis). In turn, MOFs obtained using the method described herein can possess properties that would be absent in the same MOF produced in accordance to conventional synthesis procedures.

For instance, Cu-BTC MOF crystals obtained with the method described herein can be electrically active. A consequence of the increased surface area to volume ratio of the swordlike MOFs described above in Example 5 is the corresponding exposure of the Cu nodes along their surface. As a result, the MOF is electrically conductive.

Figure 13:
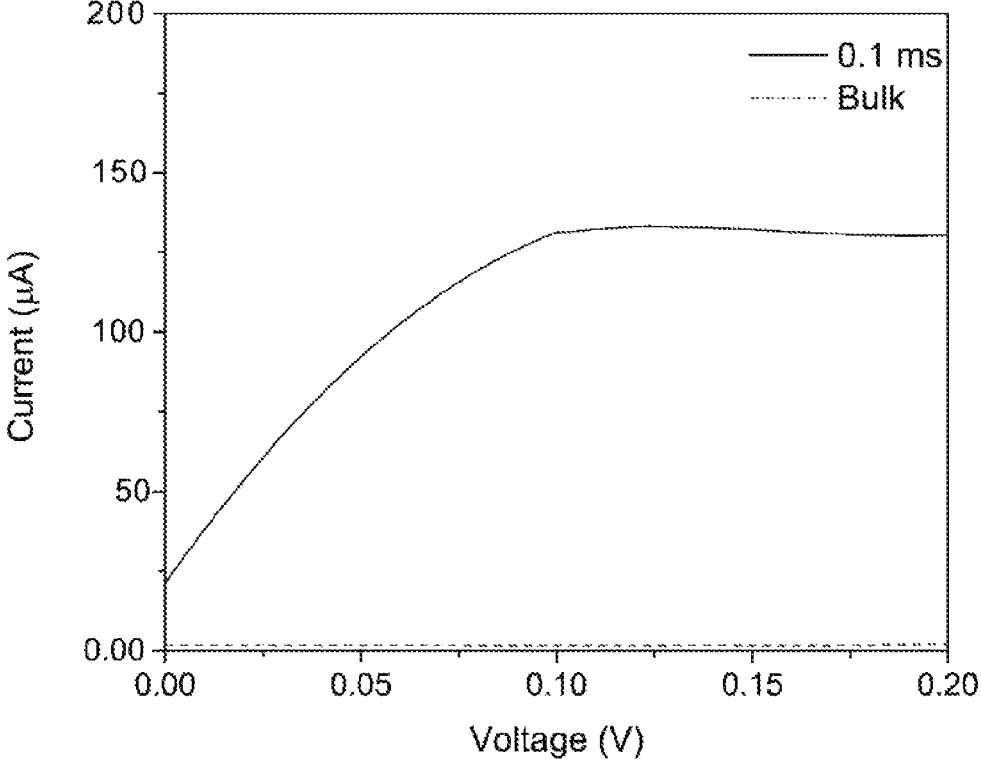
FIG. 13 shows current-voltage curve of a 1 cm² film comprising 0.1 mg of neat (additive-free) 1D sword-like Cu-BTC MOF crystals synthesized according to an embodiment method of the invention at optimum pulse duration of 0.1 ms (solid line), compared with that of a film made of 0.1 mg of neat bulk cubic (30 m crystal dimension) HKUST-1 crystals synthesized through conventional bulk solvothermal method (dashed line).

FIG. 13 shows a current-voltage curve of a 1 cm² film comprising 0.1 mg of neat (additive-free) 1D sword-like Cu-BTC MOF crystals synthesized according to the procedure described above at optimum pulse duration of 0.1 ms (solid line), compared with that of a film made of 0.1 mg of neat bulk cubic (30 m crystal dimension) Cu-BTC MOF crystals synthesized through conventional bulk solvothermal method (dashed line at 0 μA current).

The current-voltage curves indicate an approximate 100-fold improvement in the current density in the as-synthesized swordlike Cu-BTC crystals using 0.1 ms optimal pulse duration (125 μA cm⁻² at a low overpotential $\eta_{10}$ of 120 mV), compared to the value (0.002 μA cm⁻² at an overpotential $\eta_{10}$ of 2V) obtained for films made from bulk 3D cubic HKUST-1 crystals synthesized using conventional bulk solvothermal method. This is consistent with the 50- to 70-fold increase in the surface area to volume ratio observed from the data shown in Example 5.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

The claims defining the invention are as follows:

1. A method of preparing a Metal Organic Framework (MOF), the method comprising:
   depositing a liquid comprising MOF precursors on a surface of a piezoelectric substrate, the MOF precursors comprising a metal ion and an organic ligand, and
   applying an electrical input to the piezoelectric substrate to induce propagation of travelling acoustic waves across the piezoelectric substrate, which in turn causes the liquid to form an acoustowetting film in a linear direction on the piezoelectric substrate, within which the MOF precipitates.

2. The method of claim 1, wherein the acoustic waves cause the liquid to nebulise to afford activated MOF.

3. The method of claim 1, wherein the acoustic waves comprise surface acoustic waves (SAWs), bulk acoustic waves, and/or hybrid surface-bulk acoustic waves.

4. The method of claim 1, wherein the acoustic waves comprise a surface reflected bulk wave (SRBW).

5. The method of claim 1, wherein the piezoelectric substrate comprises inter-digital transducers (IDTs) to generate the acoustic waves.

6. The method of claim 1, wherein the electrical input is electric voltage alternating at a frequency of at least about 1 MHz.

7. The method of claim 1, wherein the input voltage is less than 100 Vrms.

8. The method of claim 1, wherein the piezoelectric substrate comprises lithium tantalate or lithium niobate.

9. The method of claim 1, wherein the electrical input is pulse-modulated electrical voltage.

10. The method of claim 9, wherein the electrical input is pulse-modulated electrical voltage having a pulse duration from 10 ns to 2 seconds.

11. The method of claim 1, wherein the MOF forms at a temperature below about 100° C.

12. The method of claim 1, wherein the liquid comprising MOF precursors is continuously deposited on the surface of the piezoelectric substrate.

13. The method of claim 1, wherein the metal ion is one or more ion of Cu, Ni, Fe, Co, Zn, Mn, Ru, Mo, Cr, W, Rh, Zr, and Pd.

14. The method of claim 1, wherein the organic ligand has at least two groups each selected from carboxylate groups, phosphylate groups, sulfonate groups, N-heterocyclic groups, and a combination thereof.

15. A metal organic framework (MOF) prepared by the method of claim 1.

16. The MOF of claim 15, the MOF being one of UiO-66, ZIF-8, and MIL-88.

17. A method of collecting a MOF, the method comprising:

preparing the MOF according to the method of claim 1, wherein the acoustic waves also cause nebulisation of the liquid, which ejects the MOF from the piezoelectric substrate, and collecting the ejected MOF.

18. The method of claim 17, wherein the ejected MOF is collected in or on a target substrate.

19. The method of claim 18, wherein the target substrate has masked and un-masked surfaces and the ejected MOF is collected on an un-masked surface.

20. The method of claim 19, wherein the masked surface is masked by a stencil or a photoresist.

* * * * *